(12) United States Patent
Tokuda et al.

(10) Patent No.: US 12,528,983 B2
(45) Date of Patent: Jan. 20, 2026

(54) CURABLE RESIN COMPOSITION AND DISPLAY DEVICE

(71) Applicant: SUMITOMO CHEMICAL COMPANY, LIMITED, Tokyo (JP)

(72) Inventors: Masayoshi Tokuda, Osaka (JP);
Yoshihiro Harada, Osaka (JP);
Yoshifumi Komatsu, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 849 days.

(21) Appl. No.: 17/785,832

(22) PCT Filed: Mar. 19, 2021

(86) PCT No.: PCT/JP2021/011417
§ 371 (c)(1),
(2) Date: Jun. 15, 2022

(87) PCT Pub. No.: WO2021/200277
PCT Pub. Date: Oct. 7, 2021

(65) Prior Publication Data
US 2023/0074438 A1 Mar. 9, 2023

(30) Foreign Application Priority Data
Mar. 31, 2020 (JP) .................. 2020-062615

(51) Int. Cl.
| | | |
|---|---|---|
| *C09K 11/02* | (2006.01) | |
| *B82Y 20/00* | (2011.01) | |
| *B82Y 40/00* | (2011.01) | |
| *C08F 2/50* | (2006.01) | |
| *C08F 220/06* | (2006.01) | |
| *C08F 220/14* | (2006.01) | |
| *C08F 220/18* | (2006.01) | |
| *C08F 220/32* | (2006.01) | |
| *C08K 3/22* | (2006.01) | |
| *C08K 5/09* | (2006.01) | |
| *C08K 5/37* | (2006.01) | |
| *C09K 11/70* | (2006.01) | |
| *C09K 11/88* | (2006.01) | |
| *H10K 50/115* | (2023.01) | |

(52) U.S. Cl.
CPC ............ *C09K 11/02* (2013.01); *C08F 2/50* (2013.01); *C08F 220/06* (2013.01); *C08F 220/14* (2013.01); *C08F 220/1811* (2020.02); *C08F 220/325* (2020.02); *C08K 5/09* (2013.01); *C08K 5/37* (2013.01); *C09K 11/703* (2013.01); *C09K 11/883* (2013.01); *H10K 50/115* (2023.02); *B82Y 20/00* (2013.01); *B82Y 40/00* (2013.01); *C08K 2003/2237* (2013.01); *C08K 2201/011* (2013.01)

(58) Field of Classification Search
CPC ..... C09K 11/02; C09K 11/703; C09K 11/883; C08F 220/325; C08F 220/1811; C08F 220/06; C08F 220/14; C08F 2/50; H10K 50/115; C08K 5/09; C08K 5/37
USPC ............................................. 252/301.36
See application file for complete search history.

(56) References Cited

U.S. PATENT DOCUMENTS

| | | |
|---|---|---|
| 9,574,132 B2 | 2/2017 | Qiu |
| 10,767,108 B2 | 9/2020 | Armstrong et al. |
| 2019/0129302 A1 | 5/2019 | Youn et al. |
| 2019/0211259 A1 | 7/2019 | Khalil et al. |
| 2019/0278177 A1 | 9/2019 | Jeong et al. |
| 2019/0345378 A1 | 11/2019 | Armstrong et al. |
| 2020/0002604 A1* | 1/2020 | Youn ............... G02B 6/005 |
| 2021/0040383 A1 | 2/2021 | Yahata et al. |

FOREIGN PATENT DOCUMENTS

| | | |
|---|---|---|
| CN | 108445715 A | 8/2018 |
| CN | 108445716 A | 8/2018 |
| JP | 2016-065178 A | 4/2016 |
| JP | 2017-512874 A | 5/2017 |
| JP | 2018-131612 A | 8/2018 |
| JP | 2018-131614 A | 8/2018 |
| JP | 2018-528302 A | 9/2018 |
| JP | 2019-116525 A | 7/2019 |
| JP | 2019-535840 A | 12/2019 |
| KR | 2018-0047317 A | 5/2018 |
| TW | 201942331 A | 11/2019 |
| WO | WO-2019/186729 A1 | 10/2019 |
| WO | WO-2019/189495 A1 | 10/2019 |

OTHER PUBLICATIONS

JP 2018-131612 A English translation (Year: 2018).*
International Searching Authority, "International Search Report," issued in connection with International Patent Application No. PCT/JP2021/011417, dated May 18, 2021.
International Searching Authority, "Written Opinion," issued in connection with International Patent Application No. PCT/JP2021/011417, dated May 18, 2021.
European Extended Search Report issued in corresponding European Patent Application No. 21778787.8 dated Jul. 22, 2024 (12 pages).
Office Action issued in corresponding Chinese Patent Application No. 202180025408.2 dated Jun. 24, 2024 (20 pages).
Office Action issued in corresponding Chinese Patent Application No. 202180025408.2 dated Feb. 7, 2024 (19 pages).
Office Action issued in corresponding Taiwanese Patent Application No. 110110455 dated Mar. 18, 2024 (17 pages).

* cited by examiner

*Primary Examiner* — Anita Nassiri-Motlagh
(74) *Attorney, Agent, or Firm* — Foley & Lardner LLP

(57) ABSTRACT

Provided is a curable resin composition containing quantum dots (A), a compound (B-1) having a first functional group and a second functional group, a resin (C), a photopolymerizable compound (D), and a photopolymerization initiator (E), wherein the first functional group is a carboxy group and the second functional group is a carboxy group or a thiol group.

9 Claims, No Drawings

CURABLE RESIN COMPOSITION AND DISPLAY DEVICE

CROSS-REFERENCE TO RELATED APPLICATIONS

The present application claims priority under 37 U.S.C. § 371 to International Patent Application No. PCT/JP2021/011417, filed Mar. 19, 2021, which claims priority to and the benefit of Japanese Patent Application No. 2020-062615, filed on Mar. 31, 2020. The contents of these applications are hereby incorporated by reference in their entireties.

TECHNICAL FIELD

The present invention relates to a curable resin composition, a cured film thereof, and a display device including the cured film.

BACKGROUND ART

Patent Literature 1 discloses a curable resin composition containing quantum dots and a wavelength conversion film formed by using the curable resin composition.

CITATION LIST

Patent Literature

Patent Literature 1: Japanese Patent Laid-Open No. 2016-065178

SUMMARY OF INVENTION

Technical Problem

Conventional curable resin compositions containing quantum dots as a wavelength conversion material (light emitting material) have room for improvement in the dispersion of quantum dots in the composition. When the dispersibility of the quantum dots is low, the emission intensity (brightness) of wavelength-converted light emitted from the quantum dots in the cured film formed from the curable resin composition is likely to decrease.

In addition, the conventional curable resin composition has a relatively long development speed in some cases, and there is room for improvement.

An object of the present invention is to provide a curable resin composition having a sufficiently high development speed and capable of forming a cured film having good emission intensity.

Another object of the present invention is to provide a cured film formed from the curable resin composition and a display device including the cured film.

Solution to Problem

The present invention provides a curable resin composition, a cured film, and a display device shown below.

[1] A curable resin composition comprising: quantum dots (A); a compound (B-1) having a first functional group and a second functional group; a resin (C); a photopolymerizable compound (D); and a photopolymerization initiator (E),
wherein the first functional group is a carboxy group and the second functional group is a carboxy group or a thiol group.

[2] The curable resin composition according to [1], wherein the compound (B-1) has a molecular weight of 3000 or less.

[3] The curable resin composition according to [1] or [2], further comprising a compound (B-2) different from the compound (B-1), the compound (B-2) containing a polyalkylene glycol structure and having a polar group at a molecular end.

[4] The curable resin composition according to [3], wherein a content of the compound (B-2) to a content of the compound (B-1) in terms of mass ratio is 1 or more and 50 or less.

[5] The curable resin composition according to any one of [1] to [4], wherein the resin (C) is a polyalkylene glycol compound.

[6] The curable resin composition according to any one of [1] to [5], wherein a content ratio of the photopolymerizable compound (D) is 13% by mass or more based on a total amount of a solid content of the curable resin composition.

[7] The curable resin composition according to any one of [1] to [6], wherein the photopolymerizable compound (D) contains 50% by mass or more of a photopolymerizable compound having three or more ethylenically unsaturated bonds in a molecule and having no carboxy group.

[8] The curable resin composition according to any one of [1] to [7], wherein the photopolymerization initiator (E) contains an oxime compound having a first molecular structure represented by the following formula (1):

[Formula 1]

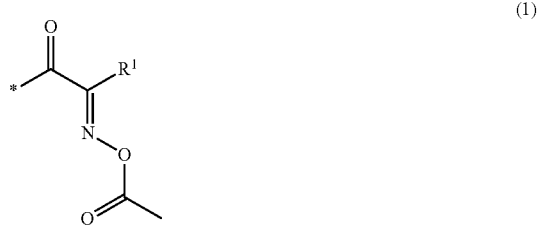

(1)

wherein $R^1$ represents $R^{11}$, $OR^{11}$, $COR^{11}$, $SR^{11}$, $CONR^{12}R^{13}$, or $CN$;

$R^{11}$, $R^{12}$, and $R^{13}$ each independently represent a hydrogen atom, an alkyl group having 1 to 20 carbon atoms, an aryl group having 6 to 30 carbon atoms, an aralkyl group having 7 to 30 carbon atoms, or a heterocyclic group having 2 to 20 carbon atoms;

the hydrogen atoms of the group represented by $R^{11}$, $R^{12}$, or $R^{13}$ are optionally replaced by $OR^{21}$, $COR^{21}$, $SR^{21}$, $NR^{22}Ra^{23}$, $CONR^{22}R^{23}$, $-NR^{22}-OR^{23}$, $-N(COR^{22})-OCOR^{23}$, $-C(=N-OR^{21})-R^{22}$, $-C(=N-OCOR^{21})-R^{22}$, CN, a halogen atom, or $COOR^{21}$;

$R^{21}$, $R^{22}$, and $R^{23}$ each independently represent a hydrogen atom, an alkyl group having 1 to 20 carbon atoms, an aryl group having 6 to 30 carbon atoms, an aralkyl group having 7 to 30 carbon atoms, or a heterocyclic group having 2 to 20 carbon atoms;

the hydrogen atoms of the group represented by $R^{21}$, $R^{22}$, or $R^{23}$ are optionally replaced by CN, a halogen atom, a hydroxy group, or a carboxy group;

when the group represented by $R^{11}$, $R^{12}$, $R^{13}$, $R^{21}$, $R^{22}$, or $R^{23}$ has an alkylene moiety, the alkylene moiety is optionally interrupted one to five times by —O—, —S—, —COO—, —OCO—, —NR$^{24}$—, —NR$^{24}$CO—, —NR$^{24}$COO—, —OCONR$^{24}$—, —SCO—, —COS—, —OCS—, or —CSO—;

R$^{24}$ represents a hydrogen atom, an alkyl group having 1 to 20 carbon atoms, an aryl group having 6 to 30 carbon atoms, an aralkyl group having 7 to 30 carbon atoms, or a heterocyclic group having 2 to 20 carbon atoms;

when the group represented by R$^{11}$, R$^{12}$, R$^{13}$, R$^{21}$, R$^{22}$, or R$^{23}$ has an alkyl moiety, the alkyl moiety is optionally branched or cyclic, and R$^{12}$ and R$^{13}$, and R$^{22}$ and R$^{23}$ are each optionally joined together to form a ring; and \* represents a bond with a second molecular structure which is a molecular structure other than the first molecular structure of the oxime compound.

[9] A cured film formed from the curable resin composition according to any one of [1] to [8].

[10] A display device comprising the cured film according to [9].

Advantageous Effects of Invention

It is possible to provide a curable resin composition having a sufficiently high development speed and capable of forming a cured film having good emission intensity, a cured film formed from the curable resin composition, and a display device including the cured film.

DESCRIPTION OF EMBODIMENTS

<Curable Resin Composition>

The curable resin composition according to the present invention (hereinafter, also simply referred to as "curable resin composition") contains quantum dots (A), a compound (B-1), a resin (C), a photopolymerizable compound (D), and a photopolymerization initiator (E).

[1] Quantum Dots (A)

The quantum dots (A) are semiconductor fine particles having a particle size of 1 nm or more and 100 nm or less and absorb ultraviolet light or visible light and emit light by utilizing a band gap of the semiconductor.

Examples of the quantum dots (A) include compounds of Group 12 element and Group 16 element such as CdS, CdSe, CdTe, ZnS, ZnSe, ZnTe, HgS, HgSe, HgTe, CdHgTe, CdSeS, CdSeTe, CdSTe, ZnSeS, ZnSeTe, ZnSTe, HgSeS, HgSeTe, HgSTe, CdZnS, CdZnSe, CdZnSe, CdHgS, CdHgSe, CdHgTe, HgZnS, HgZnSe, HgZnSe, CdZnSeS, CdZnSeTe, CdZnSTe, CdHgSeS, CdHgSeTe, CdHgSTe, HgZnSeS, HgZnSeTe and HgZnSTe; compounds of Group 13 element and Group 15 element such as GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs and InAlPAs; compounds of Group 14 element and Group 16 element such as PdS and PbSe.

When the quantum dots (A) contain S or Se, the quantum dots surface-modified with a metal oxide or an organic substance may be used. By using the surface-modified quantum dots, it is possible to prevent S or Se from being extracted by a reaction component which is contained or may be contained in the curable resin composition.

Further, the quantum dots (A) may form a core-shell structure by combining the above compounds. Examples of such a combination include fine particles having a core of CdSe and a shell of ZnS, and fine particles having a core of InP and a shell of ZnSeS.

Since the energy state of the quantum dots (A) depends on its size, the emission wavelength can be freely selected by changing the particle size. For example, in the case of quantum dots composed of only CdSe, the peak wavelengths of the fluorescence spectrum when the particle sizes are 2.3 nm, 3.0 nm, 3.8 nm, and 4.6 nm are 528 nm, 570 nm, 592 nm, and 637 nm, respectively.

The light emitted from the quantum dots (A) has a narrow spectral width, and by combining the light having such a steep peak, it is possible to expand a displayable color gamut in a display device including a cured film formed from the curable resin composition. Further, the quantum dots (A) have high responsiveness, and can efficiently utilize light emitted from a light source.

The curable resin composition may contain only one kind of quantum dots that emit light having a specific wavelength in response to light emitted from a light source, or may contain two or more kinds of quantum dots that emit light having different wavelengths in combination. Examples of the light having a specific wavelength include red light, green light, and blue light.

The content ratio of the quantum dots (A) in the curable resin composition is, for example, based on the total amount of the solid content of the curable resin composition, 1% by mass or more and 60% by mass or less, preferably 10% by mass or more and 50% by mass or less, more preferably 15% by mass or more and 50% by mass or less, still more preferably 20% by mass or more and 50% by mass or less, and yet still more preferably 20% by mass or more and 40% by mass or less.

As used herein, the total amount of solid content means the total of the components contained in the curable resin composition, excluding the solvent (G). The content ratio of the curable resin composition in the solid content can be measured by a known analytical means such as liquid chromatography or gas chromatography.

[2] Compound (B-1)

The compound (B-1) is a compound having a first functional group and a second functional group. The first functional group is a carboxy group (—COOH) and the second functional group is a carboxy group or a thiol group (—SH). The compound (B-1) has a carboxy group and/or a thiol group, and can thus be a ligand coordinated to the quantum dots (A).

The curable resin composition may contain only one compound (B-1) or two or more thereof.

When the compound (B-1) is contained in the curable resin composition, the development speed of the curable resin composition can be sufficiently increased, and the emission intensity (brightness) of a cured film formed from the curable resin composition can be increased. It is considered that this is because both the carboxy group and the thiol group of the compound (B-1) can impart high developability with an alkali developer to the curable resin composition, and can be well coordinated to the quantum dots (A) to increase the dispersibility of the quantum dots (A) in the curable resin composition. In particular, the carboxy group has a higher effect of increasing the developability of the alkali developer, and the thiol group has a higher effect of increasing the dispersibility of the quantum dots (A).

Increasing the development speed of the curable resin composition can also contribute to increasing the emission intensity (brightness) of the cured film. It is considered that this is because the permeation of water into the cured film during the developing step can be suppressed.

Further, when the compound (B-1) is contained in the curable resin composition, the solvent resistance of the cured film can be improved, and thus it is possible to improve the residual film ratio measured according to the section of Examples described below.

An example of the compound (B-1) is a compound represented by the following formula (B-1a). The compound (B-1) may be an acid anhydride of the compound represented by the formula (B-1a):

[Formula 2]

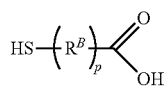

(B-1a)

[In the formula, RB represents a divalent hydrocarbon group. A plurality of RB, when present, are optionally the same or different. The hydrocarbon group may have one or more substituents. When there are a plurality of substituents, they may be the same or different, and they may be bonded to each other to form a ring together with the atoms to which they are bonded. —CH$_2$— contained in the hydrocarbon group is optionally replaced by at least one of —O—, —S—, —SO$_2$—, —CO—, and —NH—.

p represents an integer of 1 to 10.]

Examples of the divalent hydrocarbon group represented by RB include a chain hydrocarbon group, an alicyclic hydrocarbon group, and an aromatic hydrocarbon group.

Examples of the chain hydrocarbon group include a linear or branched alkanediyl group, and the number of carbon atoms thereof is usually 1 to 50, preferably 1 to 20, and more preferably 1 to 10.

Examples of the linear or branched alkanediyl group include a propane-1,2-diyl group, a propane-1,3-diyl group, a butane-1,4-diyl group, and a pentane-1,5-diyl group, a hexane-1,6-diyl group, a heptane-1,7-diyl group, an octane-1,8-diyl group, a nonan-1,9-diyl group, a decane-1,10-diyl group, an undecane-1,11-diyl group, a dodecane-1,12-diyl group, a propane-1,2-diyl group, a 1-methylbutane-1,3-diyl group, a 2-methylpropane-1,3-diyl group, a pentane-1,4-diyl group, and a 2-methylbutane-1,4-diyl group.

Examples of the alicyclic hydrocarbon group include a monocyclic or polycyclic cycloalkanediyl group, and the number of carbon atoms thereof is usually 3 to 50, preferably 3 to 20, and more preferably 3 to 10.

Examples of the monocyclic or polycyclic cycloalkanediyl group include a cyclobutane-1,3-diyl group, a cyclopentane-1,3-diyl group, a cyclohexane-1,4-diyl group, a norbornane-1,4-diyl group, a norbornane-2,3-diyl group, a norbornane-2,5-diyl group, a 5-norbornene-2,3-diyl group, an adamantane-1,5-diyl group, and an adamantan-2,6-diyl.

Examples of the aromatic hydrocarbon group include an arenediyl group, and the number of carbon atoms thereof is usually 6 to 20. Examples of the monocyclic or polycyclic arenediyl group include a benzenediyl group, a naphthalenediyl group, an anthracenediyl group, a phenanthrenidyl group, a pyrenediyl group, a pyridinediyl group, a pyrazinediyl group, and a pyrazolediyl group.

Examples of the substituent that the hydrocarbon group may have include an alkyl group having 1 to 50 carbon atoms, a cycloalkyl group having 3 to 50 carbon atoms, an aryl group having 6 to 20 carbon atoms, a carboxy group, an amino group, and a halogen atom.

Examples of the alkyl group having 1 to 50 carbon atoms include saturated or unsaturated linear or branched alkyl groups. Specific examples thereof include a methyl group, an ethyl group, a propyl group, a butyl group, a pentyl group, a hexyl group, a heptyl group, an octyl group, an isopropyl group, an isobutyl group, a sec-butyl group, a tert-butyl group, an isopentyl group, a neopentyl group, and a 2-ethylhexyl group.

Examples of the cycloalkyl group having 3 to 50 carbon atoms include a cyclopropyl group, a cyclopentyl group, a cyclohexyl group, a cycloheptyl group, and a cyclooctyl group.

Examples of the aryl group having 6 to 20 carbon atoms include a phenyl group, a biphenyl group, a tolyl group, a xylyl group, an ethylphenyl group and a naphthyl group.

Examples of the halogen atom include a fluorine atom, a chlorine atom, a bromine atom, and an iodine atom.

The substituent that the hydrocarbon group may have is preferably a carboxy group, an amino group, or a halogen atom.

When —CH$_2$— contained in the hydrocarbon group is replaced by at least one of —O—, —CO—, and —NH—, —CH$_2$— is preferably replaced by at least one of —CO— and —NH—, and more preferably —NH—.

p is preferably 1 or 2.

Examples of the compound represented by the formula (B-1a) include compounds represented by the following formulas (1-1) to (1-9).

[Formula 3]

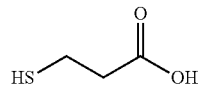

(1-1)

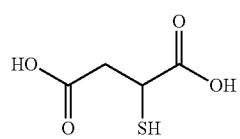

(1-2)

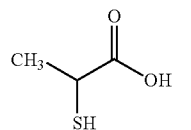

(1-3)

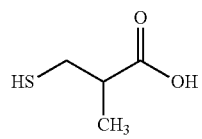

(1-4)

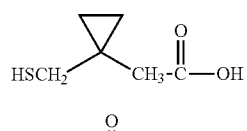

(1-5)

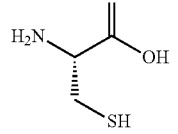

(1-6)

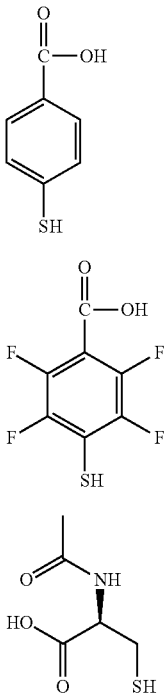

Specific examples of the compound represented by the formula (B-1a) include mercaptoacetic acid, 2-mercaptopropionic acid, 3-mercaptopropionic acid, 3-mercaptobutanoic acid, 4-mercaptobutanoic acid, mercaptosuccinic acid, mercaptostearic acid, mercaptooctanoic acid, 4-mercaptobenzoic acid, 2,3,5,6-tetrafluoro-4-mercaptobenzoic acid, L-cysteine, N-acetyl-L-cysteine, 3-methoxybutyl 3-mercaptopropionate, and 3-mercapto-2-methylpropionic acid.

Of these, 3-mercaptopropionic acid and mercaptosuccinic acid are preferable.

Another example of the compound (B-1) is a polycarboxylic acid compound, preferably a compound (B-1b) in which —SH in the formula (B-1a) is replaced by a carboxy group (—COOH) in the compound represented by the formula (B-1a).

Examples of the compound (B-1b) include the following compounds:

Succinic acid, glutaric acid, adipic acid, octafluoroadipic acid, azelaic acid, dodecanedioic acid, tetradecanedioic acid, hexadecanedioic acid, heptadecanedioic acid, octadecanedioic acid, nonadecandioic acid, dodecafluorosuberic acid, 3-ethyl-3-methylglutaric acid, hexafluoroglutaric acid, trans-3-hexenedioic acid, sebacic acid, hexadecafluorosebacic acid, acetylenedicarboxylic acid, trans-aconitic acid, 1,3-adamantandicarboxylic acid, bicyclo[2.2.2]octane-1,4-dicarboxylic acid, cis-4-cyclohexene-1,2-dicarboxylic acid, 1,1-cyclopropanedicarboxylic acid, 1,1-cyclobutanedicarboxylic acid, cis- or trans-1,3-cyclohexanedicarboxylic acid, cis- or trans-1,4-cyclohexanedicarboxylic acid, 1,1-cyclopentanediacetic acid, 1,2,3,4-cyclopentanetetracarboxylic acid, decahydro-1,4-naphthalenedicarboxylic acid, 2,3-norbornanedicarboxylic acid, 5-norbornene-2,3-dicarboxylic acid, phthalic acid, 3-fluorophthalic acid, isophthalic acid, tetrafluoroisophthalic acid, terephthalic acid, tetrafluoroterephthalic acid, 2,5-dimethylterephthalic acid, 2,6-naphthalenedicarboxylic acid, 2,3-naphthalenedicarboxylic acid, 1,4-naphthalenedicarboxylic acid, 1,1'-ferrocenedicarboxylic acid, 2,2'-biphenyldicarboxylic acid, 4,4'-biphenyldicarboxylic acid, 2,5-furandicarboxylic acid, benzophenone-2,4'-dicarboxylic acid monohydrate, benzophenone-4,4'-dicarboxylic acid, 2,3-pyrazinedicarboxylic acid, 2,3-pyridinedicarboxylic acid, 2,4-pyridinedicarboxylic acid, 3,5-pyridinedicarboxylic acid, 2,5-pyridinedicarboxylic acid, 2,6-pyridinedicarboxylic acid, 3,4-pyridinedicarboxylic acid, pyrazole-3,5-dicarboxylic acid monohydrate, 4,4'-stilbenedicarboxylic acid, anthraquinone-2,3-dicarboxylic acid, 4-(carboxymethyl)benzoic acid, chelidonic acid monohydrate, azobenzene-4,4'-dicarboxylic acid, azobenzene-3,3'-dicarboxylic acid, chlorendic acid, 1H-imidazole-4,5-dicarboxylic acid, 2,2-bis(4-carboxyphenyl)hexafluoropropane, 1,10-bis(4-carboxyphenoxy)decane, dipropylmalonic acid, dithiodiglycolic acid, 3,3'-dithiodipropionic acid, 4,4'-dithiodibutanoic acid, 4,4'-dicarboxydiphenyl ether, 4,4'-dicarboxydiphenyl sulfone, ethylene glycol bis(4-carboxyphenyl)ether, 3,4-ethylenedioxythiophene-2,5-dicarboxylic acid, 4,4'-isopropylidenediphenoxyacetic acid, 1,3-acetonedicarboxylic acid, methylenedisalicylic acid, 5,5'-thiodisalicylic acid, tris(2-carboxyethyl)isocyanurate, tetrafluorosuccinic acid, α,α,α',α'-tetramethyl-1,3-benzenedipropionic acid, and 1,3,5-benzenetricarboxylic acid.

The molecular weight of the compound (B-1) is preferably 3000 or less, more preferably 2000 or less, still more preferably 1000 or less, yet still more preferably 800 or less, and particularly preferably 500 or less, from the viewpoint of increasing the development speed of the curable resin composition and from the viewpoint of increasing the emission intensity (brightness) of the cured film. The molecular weight of the compound (B-1) is usually 100 or more.

The molecular weight may be a number-average molecular weight or a weight-average molecular weight. In this case, the number-average molecular weight and the weight-average molecular weight are a number-average molecular weight and a weight-average molecular weight in terms of standard polystyrene measured by gel permeation chromatography (GPC), respectively.

In the curable resin composition, at least a part of the molecules of the compound (B-1) is preferably coordinated to the quantum dots (A), and all or almost all the molecules may be coordinated to the quantum dots (A). That is, the curable resin composition preferably contains a compound (B-1) coordinated to the quantum dots (A), but may also contain a compound (B-1) not coordinated to the quantum dots (A) and a compound (B-1) coordinated to the quantum dots (A).

Including the compound (B-1) coordinated to the quantum dots (A) can be advantageous from the viewpoint of increasing the development speed of the curable resin composition and from the viewpoint of increasing the emission intensity (brightness) of the cured film. Usually, the compound (B-1) can be coordinated to the quantum dots (A) via the first functional group and/or the second functional group. The compound (B-1) can be coordinated to the surface of the quantum dots (A), for example.

The ratio of contents of the compound (B-1) to the quantum dots (A) in the curable resin composition is preferably 0.001 or more and 1 or less, more preferably 0.01 or more and 0.5 or less, and still more preferably 0.02 or more and 0.1 or less in terms of mass ratio. When the ratio of contents is in this range, it may be advantageous from the viewpoint of increasing the development speed of the curable resin composition and from the viewpoint of increasing the emission intensity (brightness) of the cured film.

The content ratio of the compound (B-1) in the curable resin composition is preferably 0.1% by mass or more and 20% by mass or less, more preferably 0.1% by mass or more and 10% by mass or less, still more preferably 0.2% by mass or more and 8% by mass or less, yet still more preferably 0.2% by mass or more and 5% by mass or less, and particularly preferably 0.5% by mass or more and 4% by mass or less, based on the total amount of the solid content of the curable resin composition, from the viewpoint of increasing the development speed of the curable resin composition and increasing the emission intensity (brightness) of the cured film.

[3] Compound (B-2)

The curable resin composition may further contain the compound (B-2) in addition to the compound (B-1). The compound (B-2) is a compound (B-2) different from the compound (B-1), and is a compound having a polyalkylene glycol structure and having a polar group at the molecular end. The molecular end is preferably the end of the longest carbon chain in the compound (B-2) (the carbon atom in the carbon chain is optionally replaced by another atom such as an oxygen atom).

The curable resin composition may contain only one compound (B-2) or two or more thereof.

Compounds having a polyalkylene glycol structure and having the first functional group and the second functional group are considered to belong to the compound (B-1).

From the viewpoint of increasing the development speed of the curable resin composition and from the viewpoint of increasing the emission intensity (brightness) of the cured film, the curable resin composition preferably further contains the compound (B-2).

The polyalkylene glycol structure refers to a structure represented by the following formula:

[Formula 4]

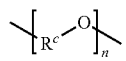

wherein n is an integer of 2 or more. In the formula, $R^C$ is an alkylene group, and examples thereof include an ethylene group and a propylene group.

Specific examples of the compound (B-2) include a polyalkylene glycol-based compound represented by the following formula (B-2a).

[Formula 5]

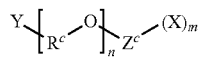

(B-2a)

In the formula (B-2a), X is a polar group, Y is a monovalent group, and $Z^C$ is a divalent or trivalent group. n is an integer of 2 or more. m is 1 or 2. $R^C$ is an alkylene group.

In the curable resin composition, at least a part of the molecules of the compound (B-2) is preferably coordinated to the quantum dots (A), and all or almost all the molecules may be coordinated to the quantum dots (A). That is, the curable resin composition preferably contains a compound (B-2) coordinated to the quantum dots (A), but may also contain a compound (B-2) not coordinated to the quantum dots (A) and a compound (B-2) coordinated to the quantum dots (A).

Including the compound (B-2) coordinated to the quantum dots (A) can be advantageous from the viewpoint of increasing the development speed of the curable resin composition and from the viewpoint of increasing the emission intensity (brightness) of the cured film. Usually, the compound (B-2) can be coordinated to the quantum dots (A) via the polar group X. When the group Y contains a polar group, the compound (B-2a) may be coordinated to the quantum dots (A) via the polar group of the group Y, or via the polar group X and the polar group of the group Y. The compound (B-2) can be coordinated to the surface of the quantum dots (A), for example.

The polar group X is preferably at least one group selected from the group consisting of a thiol group (—SH), a carboxy group (—COOH), and an amino group (—NH$_2$). The polar group selected from the group can be advantageous in increasing the coordination property to the quantum dots (A). In particular, from the viewpoint of increasing the emission intensity (brightness) of the cured film, the polar group X is more preferably at least one group selected from the group consisting of a thiol group and a carboxy group.

The group Y is a monovalent group. The group Y is not particularly limited, and examples thereof include a monovalent hydrocarbon group which may have a substituent (N, O, S, halogen atom, or the like). —CH$_2$— contained in the hydrocarbon group is optionally replaced by —O—, —S—, —C(=O)—, —C(=O)—O—, —O—C(=O)—, —C(=O)—NH—, —NH—, or the like.

The number of carbon atoms of the hydrocarbon group is, for example, 1 or more and 12 or less. The hydrocarbon group may have an unsaturated bond.

Examples of the group Y include an alkyl group having a linear, branched, or cyclic structure having 1 or more and 12 or less carbon atoms; and an alkoxy group having a linear, branched, or cyclic structure having 1 or more and 12 or less carbon atoms. The number of carbon atoms of the alkyl group and the alkoxy group is preferably 1 or more and 8 or less, more preferably 1 or more and 6 or less, and still more preferably 1 or more and 4 or less. —CH$_2$— contained in the alkyl group and the alkoxy group is optionally replaced by —O—, —S—, —C(=O)—, —C(=O)—O—, —O—C(=O)—, —C(=O)—NH—, —NH—, or the like. In particular, the group Y is preferably a linear or branched alkoxy group having 1 or more and 4 or less carbon atoms, and more preferably a linear alkoxy group having 1 or more and 4 or less carbon atoms.

The group Y may contain a polar group. Examples of the polar group include at least one group selected from the group consisting of a thiol group (—SH), a carboxy group (—COOH), and an amino group (—NH$_2$). However, as described above, compounds having a polyalkylene glycol structure and having the first functional group and the second functional group are considered to belong to the compound (B-1). The polar group is preferably located at the end of the group Y.

The group $Z^C$ is a divalent or trivalent group. The group $Z^C$ is not particularly limited, and examples thereof include a divalent or trivalent hydrocarbon group which may contain a heteroatom (N, O, S, halogen atom, or the like). The number of carbon atoms of the hydrocarbon group is, for example, 1 or more and 24 or less. The hydrocarbon group may have an unsaturated bond.

Examples of the group $Z^C$ which is a divalent group include an alkylene group having a linear, branched, or cyclic structure having 1 or more and 24 or less carbon atoms; and an alkenylene group having a linear, branched, or cyclic structure having 1 or more and 24 or less carbon atoms. The number of carbon atoms of the alkyl group and the alkenylene group is preferably 1 or more and 12 or less, more preferably 1 or more and 8 or less, and still more preferably 1 or more and 4 or less. —CH$_2$-contained in the alkyl group and the alkenylene group is optionally replaced by —O—, —S—, —C(=O)—, —C(=O)—O—, —O—C(=O)—, —C(=O)—NH—, —NH—, or the like. Examples of the group $Z^C$ which is a trivalent group include a group obtained by removing one hydrogen atom from the group $Z^C$ which is a divalent group described above.

The group $Z^C$ may have a branched structure. The group $Z^C$ having a branched structure may have a polyalkylene glycol structure different from the polyalkylene glycol structure represented by the formula (B-2a) in a branched chain different from the branched chain including the polyalkylene glycol structure represented by the formula (B-2a).

In particular, the group $Z^C$ is preferably a linear or branched alkylene group having 1 or more and 6 or less carbon atoms, and more preferably a linear alkylene group having 1 or more and 4 or less carbon atoms.

$R^C$ is an alkylene group, and is preferably a linear or branched alkylene group having 1 or more and 6 or less carbon atoms, and more preferably a linear alkylene group having 1 or more and 4 or less carbon atoms.

n in the formula (B-2a) is an integer of 2 or more, preferably 2 or more and 540 or less, more preferably 2 or more and 120 or less, and still more preferably 2 or more and 60 or less.

The molecular weight of the compound (B-2) may be, for example, about 150 or more and 10000 or less, but is preferably 150 or more and 5000 or less and more preferably 150 or more and 4000 or less from the viewpoint of increasing the development speed of the curable resin composition and from the viewpoint of increasing the emission intensity (brightness) of the cured film.

The molecular weight may be a number-average molecular weight or a weight-average molecular weight. In this case, the number-average molecular weight and the weight-average molecular weight are a number-average molecular weight and a weight-average molecular weight in terms of standard polystyrene measured by GPC, respectively.

The ratio of contents of the compound (B-2) to the quantum dots (A) in the curable resin composition is preferably 0.001 or more and 2 or less, more preferably 0.01 or more and 1.5 or less, and still more preferably 0.1 or more and 1 or less in terms of mass ratio. When the ratio of contents is in this range, it may be advantageous from the viewpoint of increasing the development speed of the curable resin composition and from the viewpoint of increasing the emission intensity (brightness) of the cured film.

The curable resin composition may further include a compound (B-3) which is a compound other than the compound (B-1) and the compound (B-2) and has coordination ability with respect to the quantum dots (A).

Examples of the compound (B-3) include an organic acid, an organic amine compound, and a thiol compound. As used herein, the compound (B-1), the compound (B-2) and the compound (B-3) may be collectively referred to as the compound (B).

The resin (C), the photopolymerizable compound (D), the photopolymerization initiator (E), the photopolymerization initiation aid (E1), the antioxidant (F), the solvent (G), the leveling agent (H), and the light scattering agent (I) are not included in the compound (B-3).

When the curable resin composition further contains the compound (B-3), the ratio of the total content of the compound (B-2) and the compound (B-3) to the content of the quantum dots (A) is preferably 0.001 or more and 2 or less, more preferably 0.01 or more and 1.5 or less, and still more preferably 0.1 or more and 1 or less in terms of mass ratio. When the ratio of contents is in this range, it may be advantageous from the viewpoint of increasing the development speed of the curable resin composition and from the viewpoint of increasing the emission intensity (brightness) of the cured film.

The ratio of contents of the compound (B-2) to the compound (B-1) in the curable resin composition is preferably 1 or more and 50 or less, more preferably 5 or more and 40 or less, and still more preferably 10 or more and 25 or less in terms of mass ratio. When the ratio of contents is in this range, it may be advantageous from the viewpoint of increasing the development speed of the curable resin composition and from the viewpoint of increasing the emission intensity (brightness) of the cured film.

The molecular weight of the compound (B-1) is preferably smaller than the molecular weight of the compound (B-2). When the curable resin composition further contains the compound (B-3), the molecular weight of the compound (B-1) is preferably smaller than the molecular weight of at least one of the compound (B-2) and the compound (B-3). Satisfying such a molecular weight relationship may be advantageous from the viewpoint of increasing the development speed of the curable resin composition and from the viewpoint of increasing the emission intensity (brightness) of the cured film.

The content ratio of the compound (B-2) in the curable resin composition is preferably 0.1% by mass or more and 40% by mass or less, more preferably 0.1% by mass or more and 20% by mass or less, still more preferably 1% by mass or more and 15% by mass or less, and yet still more preferably 2% by mass or more and 10% by mass or less, based on the total amount of the solid content of the curable resin composition, from the viewpoint of increasing the development speed of the curable resin composition and increasing the emission intensity (brightness) of the cured film.

[4] Resin (C)

Examples of the resin (C) include the following resins [K1] to [K4]:

resin [K1]: copolymer of at least one (a) (hereinafter also referred to as "(a)") selected from the group consisting of an unsaturated carboxylic acid and an unsaturated carboxylic acid anhydride and a monomer (c) (hereinafter also referred to as "(c)") copolymerizable with (a) (but different from (a));

resin [K2]: resin obtained by reacting a copolymer of (a) and (c) with a monomer (b) (hereinafter also referred to as "(b)") having a cyclic ether structure having 2 to 4 carbon atoms and an ethylenically unsaturated bond;

resin [K3]: resin obtained by reacting a copolymer of (b) and (c) with (a); and resin [K4]: resin obtained by reacting a copolymer of (b) and (c) with (a) and further reacting with a carboxylic acid anhydride.

Examples of (a) include unsaturated monocarboxylic acids such as (meth)acrylic acid, crotonic acid, and o-, m-, and p-vinylbenzoic acid;

unsaturated dicarboxylic acids such as maleic acid, fumaric acid, citraconic acid, mesaconic acid, itaconic acid, 3-vinylphthalic acid, 4-vinylphthalic acid, 3,4,5,6-tetrahydrophthalic acid, 1,2,3,6-tetrahydrophthalic acid, dimethyltetrahydrophthalic acid, and 1,4-cyclohexenedicarboxylic acid;

bicyclo unsaturated compounds containing a carboxy group, such as methyl-5-norbornene-2,3-dicarboxylic acid, 5-carboxybicyclo[2.2.1]hept-2-ene, 5,6-dicarboxybicyclo[2.2.1]hept-2-ene, 5-carboxy-5-methylbicyclo[2.2.1]hept-2-ene, 5-carboxy-5-ethylbicyclo[2.2.1]hept-2-ene, 5-carboxy-6-methylbicyclo[2.2.1]hept-2-ene, and 5-carboxy-6-ethylbicyclo[2.2.1]hept-2-ene;

unsaturated dicarboxylic acid anhydrides such as maleic anhydride, citraconic anhydride, itaconic anhydride, 3-vinylphthalic anhydride, 4-vinylphthalic anhydride, 3,4,5,6-tetrahydrophthalic anhydride, 1,2,3,6-tetrahydrophthalic anhydride, dimethyltetrahydrophthalic anhydride, 5,6-dicarboxybicyclo[2.2.1]hept-2-ene anhydride;

unsaturated mono[(meth)acryloyloxyalkyl]esters of di- or higher polycarboxylic acids such as mono[2-(meth)acryloyloxyethyl]succinate and mono[2-(meth)acryloyoxyethyl]phthalate; and unsaturated (meth)acrylates containing a hydroxy group and a carboxy group in the same molecule, such as α-(hydroxymethyl) (meth)acrylic acid.

Of these, (meth)acrylic acid, maleic anhydride and the like are preferable from the viewpoint of copolymerization reactivity and solubility of the obtained resin in an alkaline aqueous solution.

As used herein, the term (meth)acrylic acid means acrylic acid and/or methacrylic acid. The same applies to "(meth) acryloyl", "(meth)acrylate" and the like.

(b) is, for example, a monomer having a cyclic ether structure having 2 to 4 carbon atoms (for example, at least one selected from the group consisting of an oxirane ring, an oxetane ring, and a tetrahydrofuran ring) and an ethylenically unsaturated bond. (b) is preferably a monomer having a cyclic ether structure having 2 to 4 carbon atoms and a (meth)acryloyloxy group.

Examples of (b) include monomers having an oxirane ring and an ethylenically unsaturated bond, such as glycidyl (meth)acrylate, β-methylglycidyl (meth)acrylate, β-ethylglycidyl (meth)acrylate, glycidyl vinyl ether, o-vinylbenzyl glycidyl ether, m-vinylbenzyl glycidyl ether, p-vinylbenzyl glycidyl ether, α-methyl-o-vinylbenzyl glycidyl ether, α-methyl-m-vinylbenzyl glycidyl ether, α-methyl-p-vinylbenzyl glycidyl ether, 2,3-bis(glycidyloxymethyl)styrene, 2,4-bis(glycidyloxymethyl)styrene, 2,5-bis(glycidyloxymethyl) styrene, 2,6-bis(glycidyloxymethyl)styrene, 2,3,4-tris (glycidyloxymethyl) styrene, 2,3,5-tris(glycidyloxymethyl) styrene, 2,3,6-tris(glycidyloxymethyl) styrene, 3,4,5-tris (glycidyloxymethyl)styrene, and 2,4,6-tris (glycidyloxymethyl) styrene;

monomers having an oxetane ring and an ethylenically unsaturated bond, such as 3-methyl-3-methacryloyloxymethyloxetane, 3-methyl-3-acryloyloxymethyloxetane, 3-ethyl-3-methacryloyloxymethyloxetane, 3-ethyl-3-acryloyloxymethyloxetane, 3-methyl-3-methacryloyloxyethyloxetane, 3-methyl-3-acryloyloxyethyloxetane, 3-ethyl-3-methacryloyloxyethyloxetane, and 3-ethyl-3-acryloyloxyethyloxetane; and monomers having a tetrahydrofuran ring and an ethylenically unsaturated bond, such as tetrahydrofurfuryl acrylate (for example, Viscoat V #150, manufactured by OSAKA ORGANIC CHEMICAL INDUSTRY LTD.) and tetrahydrofurfuryl methacrylate.

(b) is preferably a monomer having an oxirane ring and an ethylenically unsaturated bond, because the reactivity during the production of the resins [K2] to [K4] is high and unreacted (b) hardly remains.

Examples of (c) include (meth)acrylic esters such as methyl (meth)acrylate, ethyl (meth)acrylate, n-butyl (meth) acrylate, sec-butyl (meth)acrylate, tert-butyl (meth)acrylate, 2-ethylhexyl (meth)acrylate, dodecyl (meth)acrylate, lauryl (meth)acrylate, stearyl (meth)acrylate, cyclopentyl (meth) acrylate, cyclohexyl (meth)acrylate, 2-methylcyclohexyl (meth)acrylate, tricyclo[5.2.1.0$^{2,6}$]decan-8-yl (meth)acrylate (referred to as "dicyclopentanyl (meth)acrylate" (common name) in the art or sometimes referred to as "tricyclodecyl (meth)acrylate"), tricyclo[5.2.1.0$^{2,6}$]decen-8-yl (meth) acrylate (which is referred to as "dicyclopentenyl (meth) acrylate" (common name) in the art), dicyclopentanyloxyethyl (meth)acrylate, isobornyl (meth) acrylate, adamantyl (meth)acrylate, allyl (meth)acrylate, propargyl (meth)acrylate, phenyl (meth)acrylate, naphthyl (meth)acrylate, and benzyl (meth)acrylate;

hydroxy group-containing (meth)acrylic esters such as 2-hydroxyethyl (meth)acrylate and 2-hydroxypropyl (meth)acrylate;

dicarboxylic diesters such as diethyl maleate, diethyl fumarate, and diethyl itaconate;

bicyclo unsaturated compounds such as bicyclo[2.2.1] hept-2-ene, 5-methylbicyclo[2.2.1]hept-2-ene, 5-ethylbicyclo[2.2.1]hept-2-ene, 5-hydroxybicyclo[2.2.1] hept-2-ene, 5-hydroxymethylbicyclo[2.2.1]hept-2-ene, 5-(2'-hydroxyethyl)bicyclo[2.2.1]hept-2-ene, 5-methoxybicyclo[2.2.1]hept-2-ene, 5-ethoxybicyclo [2.2.1]hept-2-ene, 5,6-dihydroxybicyclo[2.2.1]hept-2-ene, 5,6-di(hydroxymethyl)bicyclo[2.2.1]hept-2-ene, 5,6-di(2'-hydroxyethyl)bicyclo[2.2.1]hept-2-ene, 5,6-dimethoxybicyclo[2.2.1]hept-2-ene, 5,6-diethoxybicyclo[2.2.1]hept-2-ene, 5-hydroxy-5-methylbicyclo [2.2.1]hept-2-ene, 5-hydroxy-5-ethylbicyclo[2.2.1] hept-2-ene, 5-hydroxymethyl-5-methylbicyclo[2.2.1] hept-2-ene, 5-tert-butoxycarbonylbicyclo[2.2.1]hept-2-ene, 5-cyclohexyloxycarbonylbicyclo[2.2.1]hept-2-ene, 5-phenoxycarbonylbicyclo[2.2.1]hept-2-ene, 5,6-bis(tert-butoxycarbonyl)bicyclo[2.2.1]hept-2-ene, and 5,6-bis(cyclohexyloxycarbonyl)bicyclo[2.2.1]hept-2-ene;

dicarbonylimide derivatives such as N-phenylmaleimide, N-cyclohexylmaleimide, N-benzylmaleimide, N-succinimidyl-3-maleimidobenzoate, N-succinimidyl-4-maleimidobutyrate, N-succinimidyl-6-maleimide caproate, N-succinimidyl-3-maleimide propionate, and N-(9-acridinyl)maleimide; and styrene, α-methylstyrene, m-methylstyrene, p-methylstyrene, vinyltoluene, p-methoxystyrene, acrylonitrile, methacrylonitrile, vinyl chloride, vinylidene chloride, acrylamide, methacrylamide, vinyl acetate, 1,3-butadiene, isoprene, and 2,3-dimethyl-1,3-butadiene.

Among these, from the viewpoint of copolymerization reactivity and heat resistance of the resin (C), styrene, vinyltoluene, N-phenylmaleimide, N-cyclohexylmaleimide, N-benzylmaleimide, bicyclo[2.2.1]hept-2-ene and the like are preferable.

In the resin [K1], the ratio of the structural unit derived from each of (a) and (c) in the total structural units constituting the resin [K1] is preferably the following:

the structural unit derived from (a): 2 mol % or more and 60 mol % or less; and the structural unit derived from (c): 40 mol % or more and 98 mol % or less, and more preferably the following:

the structural unit derived from (a): 10 mol % or more and 50 mol % or less; and the structural unit derived from (c): 50 mol % or more and 90 mol % or less.

When the ratio of the structural units of the resin [K1] is within the above range, the curable resin composition tends to be excellent in storage stability, developability, and solvent resistance of the obtained cured pattern.

As used herein, the cured pattern is one embodiment of the cured film, and refers to a cured film formed in a pattern.

The resin [K1] can be produced with reference to the method disclosed in for example, a document "Experimental Method for Polymer Synthesis" (edited by Takayuki Otsu, published by Kagaku-Dojin Publishing Company, INC, First Edition, First Printed on Mar. 1, 1972) and cited documents described in the above-mentioned document.

Specific examples thereof include the following method: predetermined amounts of (a) and (c), a polymerization initiator, a solvent and the like are placed in a reaction vessel; for example, a deoxidization atmosphere is formed by replacing oxygen with nitrogen; and these are heated or kept warm during stirring.

The polymerization initiator, the solvent and the like which are used here are not particularly limited, and those commonly used in the art can be used. Examples of the polymerization initiator include azo compounds (2,2'-azobisisobutyronitrile, 2,2'-azobis(2,4-dimethylvaleronitrile) and the like) and organic peroxides (benzoyl peroxide and the like), and the solvent may be a solvent capable of dissolving each monomer, and examples of the solvent (G) that may be contained in the curable resin composition of the present invention include solvents to be described later.

A solution after a reaction, of the resultant copolymer may be used as it is; a concentrated or diluted solution of the copolymer may be used; or a solid (powder) taken out from the copolymer by a method such as reprecipitation may be used. When the solvent (G) described later is used as the solvent for the polymerization, the solution after the reaction can be used as it is for the preparation of the curable resin composition, whereby the producing process of the curable resin composition can be simplified.

The resin [K2] can be produced by adding a cyclic ether having 2 to 4 carbon atoms of (b) to the copolymer of (a) and (c), that is, to a carboxylic acid and/or a carboxylic acid anhydride of (a).

The copolymer of (a) and (c) is first produced in the same manner as in the method described as the method for producing the resin [K1]. In this case, the ratio of the structural unit derived from each of (a) and (c) is preferably the same ratio as that described in the resin [K1].

Next, a cyclic ether having 2 to 4 carbon atoms of (b) is reacted with a part of the carboxylic acid and/or the carboxylic acid anhydride derived from (a) in the copolymer.

Subsequent to the production of the copolymer of (a) and (c), the resin [K2] can be produced by replacing a nitrogen atmosphere in a flask with air, and reacting (b) in the presence of a reaction catalyst for a carboxylic acid or a carboxylic acid anhydride and a cyclic ether (for example, an organic phosphorus compound, a metallic complex, or an amine compound), and a polymerization inhibitor (for example, hydroquinone and the like), for example, at 60° C. or more and 130° C. or less for 1 to 10 hours.

The amount of (b) used is preferably 5 mol or more and 80 mol or less, and more preferably 10 mol or more and 75 mol or less, based on 100 mol of (a). Within this range, the storage stability of the curable resin composition, the developability of the curable resin composition, and the solvent resistance, heat resistance, mechanical strength and sensitivity of the cured pattern tend to be well balanced.

Examples of the organic phosphorus compound as a reaction catalyst include triphenylphosphine. As the amine compound as the reaction catalyst, for example, an aliphatic tertiary amine compound or an aliphatic quaternary ammonium salt compound can be used, and specific examples thereof include tris(dimethylaminomethyl)phenol, triethylamine, tetrabutylammonium bromide, and tetrabutylammonium chloride. From the viewpoint of developability of the curable resin composition and emission intensity of the cured film, the reaction catalyst is preferably an organic phosphorus compound.

The amount of the reaction catalyst used is preferably 0.001 part by mass or more and 5 parts by mass or less based on 100 parts by mass of the total amount of (a), (b), and (c).

The amount of the polymerization inhibitor used is preferably 0.001 part by mass or more and 5 parts by mass or less based on 100 parts by mass of the total amount of (a), (b), and (c).

The reaction conditions such as the charging method, the reaction temperature and the time can be appropriately adjusted in consideration of the production equipment, the amount of heat generated by the polymerization, and the like. In the same manner as the polymerization conditions, the charging method and the reaction temperature can be appropriately adjusted in consideration of the production equipment, the amount of heat generated by the polymerization, and the like.

The resin [K3] is produced by producing a copolymer of (b) and (c) in the same manner as in the above-mentioned method for producing the resin [K1] as a first step. In the same manner as in the above, a solution after a reaction, of the resultant copolymer may be used as it is; a concentrated or diluted solution of the copolymer may be used; or a solid (powder) taken out from the copolymer by a method such as reprecipitation may be used.

The ratio of the structural unit derived from each of (b) and (c) based on the total number of moles of the total structural units constituting the copolymer is preferably the following:

the structural unit derived from (b): 5 mol % or more and 95 mol % or less; and the structural unit derived from (c): 5 mol % or more and 95 mol % or less, and more preferably the following:

the structural unit derived from (b): 10 mol % or more and 90 mol % or less; and the structural unit derived from (c): 10 mol % or more and 90 mol % or less.

The resin [K3] can be produced by reacting a carboxylic acid or a carboxylic acid anhydride of (a) with the cyclic ether derived from (b) contained in the copolymer of (b) and (c) under the same conditions as those of the method for producing the resin [K2].

The amount of (a) used which is reacted with the copolymer is preferably 5 mol or more and 80 mol or less based on 100 mol of (b).

The resin [K4] is a resin obtained by further reacting the resin [K3] with a carboxylic acid anhydride. A carboxylic acid anhydride is reacted with a hydroxy group generated by a reaction between a cyclic ether and a carboxylic acid or a carboxylic anhydride.

Examples of the carboxylic acid anhydride include maleic anhydride, citraconic anhydride, itaconic anhydride, 3-vinylphthalic anhydride, 4-vinylphthalic anhydride, 3,4,5,6-tetrahydrophthalic anhydride, 1,2,3,6-tetrahydrophthalic anhydride, dimethyltetrahydrophthalic anhydride, 5,6-dicarboxybicyclo[2.2.1]hept-2-ene anhydride.

The amount of the carboxylic acid anhydride used is preferably 0.5 to 1 mol based on 1 mol of the amount used in (a).

Specific examples of the resin (K1), the resin (K2), the resin (K3), and the resin (K4) include a resin [K1] such as a benzyl (meth)acrylate/(meth)acrylic acid copolymer and a styrene/(meth)acrylic acid copolymer;

a resin [K2] such as a resin produced by adding glycidyl (meth)acrylate to a benzyl (meth)acrylate/(meth)acrylic acid copolymer, a resin produced by adding glycidyl (meth)acrylate to a tricyclodecyl (meth)acrylate/styrene/(meth)acrylic acid copolymer, or a resin produced by adding glycidyl (meth)acrylate to a tricyclodecyl (meth)acrylate/benzyl (meth)acrylate/(meth)acrylic acid copolymer; a resin [K3] such as a resin produced by reacting a tricyclodecyl (meth)acrylate/glycidyl (meth)acrylate copolymer with (meth)acrylic acid or a resin produced by reacting a tricyclodecyl (meth)acrylate/styrene/glycidyl (meth)acrylate copolymer with (meth)acrylic acid; and a resin [K4] such as a resin produced by reacting a tricyclodecyl (meth)acrylate/glycidyl (meth)acrylate copolymer with (meth)acrylic acid to produce a resin and then reacting this resin with tetrahydrophthalic anhydride.

In particular, the resin (C) preferably contains at least one selected from the group consisting of the resin [K2], the resin [K3], and the resin [K4].

As a further example of the resin (C), the alkali-soluble resin disclosed in Japanese Patent Laid-Open No. 2018-123274 can be mentioned. Examples of the alkali-soluble resin include a polymer (hereinafter, also referred to as "resin (Ca)") which has a double bond in a side chain, includes a structural unit (α) represented by the following formula (I) and a structural unit (β) represented by the following formula (II) in a main chain, and further includes an acid group.

The acid group may be introduced into the resin when, for example, the resin (Ca) contains a structural unit (γ) derived from an acid group-containing monomer (for example, (meth)acrylic acid). The resin (Ca) preferably contains the structural units (α), (β), and (γ) in the main chain skeleton.

[Formula 6]

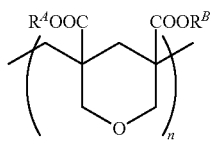

(I)

[In the formula, RA and RB are the same or different and each represent a hydrogen atom or a hydrocarbon group having 1 to 25 carbon atoms. n represents the average number of repeating units of the structural units represented by the formula (I), and is a number of 1 or more.]

[Formula 7]

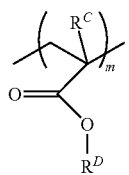

(II)

[In the formula, each $R^C$ is the same or different and represents a hydrogen atom or a methyl group. Each RD is the same or different and represents a linear or branched chain hydrocarbon group having 4 to 20 carbon atoms. m represents the average number of repeating units of the structural units represented by the formula (II), and is a number of 1 or more.]

The content proportion of the structural unit (α) in the resin (Ca) is, for example, from the viewpoint of heat resistance and storage stability of the resin (Ca), 0.5% by mass or more and 50% by mass or less, preferably 1% by mass or more and 40% by mass or less, and more preferably 5% by mass or more and 30% by mass or less based on 100% by mass of the total amount of all monomer units that give the main chain skeleton of the resin (Ca). In the formula (I), n represents the average number of repeating units of the structural units (α) in the resin (Ca), and n can be set so that the content proportion of the structural units (α) falls within the above range.

The content proportion of the structural unit (β) is, for example, from the viewpoint of the solvent resistance of the cured film, 10% by mass or more and 90% by mass or less, preferably 20% by mass or more and 80% by mass or less, and more preferably 30% by mass or more and 75% by mass or less based on 100% by mass of the total amount of all monomer units that give the main chain skeleton of the resin (Ca). In the formula (II), m represents the average number of repeating units of the structural units (β) in the resin (Ca), and m can be set so that the content proportion of the structural units (β) falls within the above range.

The content proportion of the structural unit (γ) is, for example, from the viewpoint of the solubility of the resin (Ca) in the alkaline substance and the solubility of the resin (Ca) in the solvent (G), 0.5% by mass or more and 50% by mass or less, preferably 2% by mass or more and 50% by mass or less, and more preferably 5% by mass or more and 45% by mass or less based on 100% by mass of the total amount of all monomer units that give the main chain skeleton of the resin (Ca).

The resin (C) may contain one or more selected from the group consisting of the resin [K1], resin [K2], resin [K3], resin [K4], and resin (Ca) described above.

Further examples of the resin (C) include polyalkylene glycol compounds. Examples of the polyalkylene glycol compound include polyethylene glycol and polypropylene glycol. The polyalkylene glycol compound is advantageous in further increasing the dispersibility of the quantum dots (A) in the curable resin composition.

The resin (C) preferably has a weight-average molecular weight of 9000 or less in terms of standard polystyrene measured by GPC. When the resin (C) has the above weight-average molecular weight, the development speed of the curable resin composition can be improved and a cured film having high light emission intensity tends to be obtained.

The weight-average molecular weight of the resin (C) in terms of standard polystyrene is, for example, 1000 or more and 9000 or less, and is preferably 2000 or more and 8500 or less and more preferably 3000 or more and 8500 or less, from the viewpoints of the development speed of the curable resin composition and the emission intensity of the cured film.

The weight-average molecular weight of the resin (C) in terms of standard polystyrene is measured according to the measurement method described in the section of Examples below.

The weight-average molecular weight of the resin (C) can be adjusted within the above range by appropriately combining the selection of raw materials to be used, a charging method, and reaction conditions such as reaction temperature and time.

The molecular weight distribution [weight-average molecular weight (Mw)/number-average molecular weight (Mn)] of the resin (C) measured by GPC is, for example, 1.0 or more and 6.0 or less, and preferably 1.2 or more and 4.0 or less from the viewpoint of developability of the cured film of the curable resin composition.

When the resin (C) is one or more kinds selected from the group consisting of the resin [K1], the resin [K2], the resin [K3], the resin [K4] and the resin (Ca) described above, the acid value of the resin (C) is preferably 90 mg KOH/g or more and 150 mg KOH/g or less based on the solid content. When the acid value is less than 90 mg KOH/g, the solubility of the curable resin composition in an alkali developer may be lowered and a residue may be left on the substrate, and when the acid value is more than 150 mg KOH/g, peeling of the cured pattern obtained by development is more likely to occur.

The acid value of the resin (C) is preferably 95 mg KOH/g or more and 140 mg KOH/g or less, more preferably 100 mg KOH/g or more and 130 mg KOH/g or less, from the viewpoint of the developability of the curable resin composition.

The acid value is a value measured as the amount (mg) of potassium hydroxide necessary for neutralizing 1 g of the resin (C), and can be obtained by titrating with, for example, an aqueous potassium hydroxide solution. The acid value of the resin (C) is measured according to the measurement method described in the section of Examples below.

When the resin (C) is one or more kinds selected from the group consisting of the resin [K1], the resin [K2], the resin [K3], the resin [K4] and the resin (Ca) described above, the resin (C) can contain a resin having a double bond equivalent of, for example, 300 g/eq or more and 2000 g/eq or less, preferably 500 g/eq or more and 1500 g/eq or less. Since the resin (C) contains a resin having a double bond equivalent of 300 g/eq or more and 2000 g/eq or less, the phenomenon of being quenched during the step of producing the cured pattern tends to be easily prevented. When the resin (C) contains a resin having a double bond equivalent exceeding 2000 g/eq, the ability of the resin (C) to effectively protect the quantum dots (A) tends to decrease. When the resin (C) contains a resin having a double bond equivalent of less than 300 g/eq, the cured pattern tends to be easily peeled off without being dissolved during development.

Examples of the resin having a double bond equivalent of 300 g/eq or more and 2000 g/eq or less include (meth)acrylic resins. When the resin (C) is one or more kinds selected from the group consisting of the resin [K1], the resin [K2], the resin [K3], the resin [K4] and the resin (Ca) described above, the acid value of the resin (C) is preferably composed of a (meth)acrylic resin.

The content ratio of the resin (C) in the curable resin composition is, for example, based on the total amount of the solid content of the curable resin composition, 5% by mass or more and 80% by mass or less, preferably 10% by mass or more and 70% by mass or less, more preferably 13% by mass or more and 60% by mass or less, and still more preferably 17% by mass or more and 55% by mass or less. When the content ratio of the resin (C) is within the above range, the quantum dots (A) tend to be easily dispersed and the emission efficiency tends to be easily maintained at a high level during the step of producing a cured pattern.

In the curable resin composition, the mass ratio (solid content ratio) of the resin (C) to the photopolymerizable compound (D) described later is, for example, 1 or more, and is preferably 1.5 or more, more preferably 2 or more, and still more preferably 2.5 or more from the viewpoint of developability of the curable resin composition and emission intensity of the cured film.

[5] Photopolymerizable Compound (D)

The photopolymerizable compound (D) is a compound that can be polymerized by an active radical, an acid, or the like generated from the photopolymerization initiator (E) described later, and examples thereof include a compound having an ethylenically unsaturated bond, and a (meth) acrylic ester compound is preferable.

In particular, the photopolymerizable compound (D) is preferably a polymerizable compound having three or more ethylenically unsaturated bonds. The weight-average molecular weight of the photopolymerizable compound (D) is preferably 150 or more and 2900 or less, and more preferably 250 or more and 1500 or less.

Examples of the polymerizable compound having three or more ethylenically unsaturated bonds include a photopolymerizable compound (Da) having three or more ethylenically unsaturated bonds and having a carboxy group in a molecule, and a photopolymerizable compound (db) having three or more ethylenically unsaturated bonds and having no carboxy group in a molecule. The photopolymerizable compound (D) preferably contains at least one photopolymerizable compound (Da) and a photopolymerizable compound (db), and may contain two or more photopolymerizable compounds (Da), two or more photopolymerizable compounds (db), or at least one photopolymerizable compound (Da) and at least one photopolymerizable compound (db).

When the photopolymerizable compound (D) contains the photopolymerizable compound (Da), the dispersibility of the quantum dots (A) in the curable resin composition can be improved, whereby the emission intensity of the cured film can be improved. Further, when the photopolymerizable compound (D) contains the photopolymerizable compound (Da), the curability and heat resistance of the curable resin composition can be improved.

The ethylenically unsaturated bond of the photopolymerizable compound (Da) is preferably a (meth)acryloyloxy group. The number of ethylenically unsaturated bonds contained in one molecule of the photopolymerizable compound (Da) is preferably 3 to 5, and more preferably 3. The number of carboxy groups contained in one molecule of the photopolymerizable compound (Da) is preferably 1.

Examples of the photopolymerizable compound (Da) include compounds obtained by modifying a compound having three or more (meth)acryloyloxy groups and a hydroxy group, such as pentaerythritol tri(meth)acrylate or dipentaerythritol penta(meth)acrylate, with a polybasic acid. Examples of the compound include a compound obtained by monoesterifying pentaerythritol tri(meth)acrylate and succinic acid, a compound obtained by monoesterifying dipentaerythritol penta(meth)acrylate and succinic acid, a compound obtained by monoesterifying pentaerythritol tri(meth) acrylate and maleic acid, and a compound obtained by monoesterifying dipentaerythritol penta(meth)acrylate and maleic acid. Of these, a compound obtained by monoesterifying pentaerythritol tri(meth)acrylate and succinic acid is preferable.

The ethylenically unsaturated bond of the photopolymerizable compound (db) is preferably a (meth)acryloyloxy group. The number of ethylenically unsaturated bonds contained in one molecule of the photopolymerizable compound (db) is preferably 3 to 6.

Examples of the photopolymerizable compound (db) include trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, tripentaerythritol octa(meth)acrylate, tripentaerythritol hepta(meth)acrylate, tetrapentaerythritol deca(meth)acrylate, tetrapentaerythritol nona(meth)acrylate, tris(2-(meth)acryloyloxyethyl)isocyanurate, ethylene glycol-modified pentaerythritol tetra(meth)acrylate, ethylene glycol-modified dipentaerythritol hexa(meth)acrylate, propylene glycol-modified pentaerythritol tetra(meth)acrylate, propylene glycol-modified dipentaerythritol hexa(meth)acrylate, caprolactone-modified pentaerythritol tetra(meth)acrylate, caprolactone-modified dipentaerythritol hexa(meth)acrylate. Of these, dipentaerythritol penta(meth)acrylate and dipentaerythritol hexa(meth)acrylate are preferable.

The content ratio of the photopolymerizable compound (D) in the curable resin composition is preferably, based on the total amount of the solid content of the curable resin composition, 7% by mass or more and 60% by mass or less, more preferably 10% by mass or more and 45% by mass or less, and still more preferably 13% by mass or more and 30% by mass or less. When the content ratio of the photopolymerizable compound (D) is within the above range, the solvent resistance (residual film ratio) of the cured film tends to be improved.

From the viewpoint of improving the development speed of the curable resin composition, the content ratio of the photopolymerizable compound (D) is preferably 13% by mass or more, more preferably 15% by mass or more, and still more preferably 20% by mass or more, based on the total amount of the solid content of the curable resin composition.

From the viewpoint of improving the development speed of the curable resin composition, the photopolymerizable compound (D) preferably contains 50% by mass or more of the photopolymerizable compound (db). From the viewpoint of improving the solvent resistance (residual film ratio) of the cured film, the photopolymerizable compound (D) preferably contains a photopolymerizable compound (Da) and a photopolymerizable compound (db).

[6] Photopolymerization Initiator (E)

The photopolymerization initiator (E) is a compound capable of initiating polymerization by generating active radicals, acids and the like by the action of light and heat.

The photopolymerization initiator (E) preferably contains an oxime compound having a first molecular structure represented by the following formula (1). Hereinafter, the oxime compound is also referred to as "oxime compound (1)".

[Formula 8]

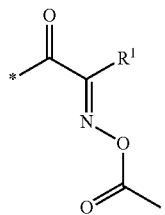

(1)

When the oxime compound (1) is contained as the photopolymerization initiator (E), it may be advantageous from the viewpoint of increasing the emission intensity (brightness) of the cured film. One of the reasons why such an effect can be exhibited is presumed to be that the oxime compound (1) has a high ability to initiate photoradical polymerization, because the absorption wavelength of the oxime compound (1) changes greatly before and after cleavage (decomposition) of the oxime compound (1), which is necessary when the oxime compound (1) initiates photopolymerization, due to the unique molecular structure of the oxime compound (1).

In the formula (1), $R^1$ represents $R^{11}$, $OR^{11}$, $COR^{11}$, $SR^{11}$, $CONR^{12}R^{13}$, or $CN$.

$R^{11}$, $R^{12}$, and $R^{13}$ each independently represent a hydrogen atom, an alkyl group having 1 to 20 carbon atoms, an aryl group having 6 to 30 carbon atoms, an aralkyl group having 7 to 30 carbon atoms, or a heterocyclic group having 2 to 20 carbon atoms.

The hydrogen atoms of the group represented by $R^{11}$, $R^{12}$, or $R^{13}$ are optionally replaced by $OR^{21}$, $COR^{21}$, $SR^{21}$, $NR^{22}Ra^{23}$, $CONR^{22}R^{23}$, $-NR^{22}-OR^{23}$, $-N(COR^{22})-OCOR^{23}$, $-C(=N-OR^{21})-R^{22}$, $-C(=N-OCOR^{21})-R^{22}$, $CN$, a halogen atom, or $COOR^{21}$.

$R^{21}$, $R^{22}$, and $R^{23}$ each independently represent a hydrogen atom, an alkyl group having 1 to 20 carbon atoms, an aryl group having 6 to 30 carbon atoms, an aralkyl group having 7 to 30 carbon atoms, or a heterocyclic group having 2 to 20 carbon atoms.

The hydrogen atoms of the group represented by $R^{21}$, $R^{22}$, or $R^{23}$ are optionally replaced by $CN$, a halogen atom, a hydroxy group, or a carboxy group.

When the group represented by $R^{11}$, $R^{12}$, $R^{13}$, $R^{21}$, $R^{22}$, or $R^{23}$ has an alkylene moiety, the alkylene moiety is optionally interrupted one to five times by $-O-$, $-S-$, $-COO-$, $-OCO-$, $-NR^{24}-$, $-NR^{24}CO-$, $-NR^{24}COO-$, $-OCONR^{24}-$, $-SCO-$, $-COS-$, $-OCS-$, or $-CSO-$.

$R^{24}$ represents a hydrogen atom, an alkyl group having 1 to 20 carbon atoms, an aryl group having 6 to 30 carbon atoms, an aralkyl group having 7 to 30 carbon atoms, or a heterocyclic group having 2 to 20 carbon atoms.

When the group represented by $R^{11}$, $R^{12}$, $R^{13}$, $R^{21}$, $R^{22}$, or $R^{23}$ has an alkyl moiety, the alkyl moiety is optionally branched or cyclic, and $R^{12}$ and $R^{13}$, and $R^{22}$ and $R^{23}$ are each optionally joined together to form a ring.

* represents a bond with a second molecular structure which is a molecular structure other than the first molecular structure of the oxime compound (1).

Examples of alkyl groups having 1 to 20 carbon atoms represented by $R^{11}$, $R^{12}$, $R^{13}$, $R^{21}$, $R^{22}$, $R^{23}$, and $R^{24}$ in the formula (1) include a methyl group, an ethyl group, a propyl group, an isopropyl group, a butyl group, an isobutyl group, a sec-butyl group, a tert-butyl group, a pentyl group, an isopentyl group, a tert-pentyl group, a hexyl group, a heptyl group, an octyl group, an isooctyl group, a 2-ethylhexyl group, a tert-octyl group, a nonyl group, an isononyl group, a decyl group, an isodecyl group, an undecyl group, a dodecyl group, a tetradecyl group, a hexadecyl group, an octadecyl group, an icosyl group, a cyclopentyl group, a cyclohexyl group, a cyclohexylmethyl group, and a cyclohexylethyl group.

Examples of aryl groups having 6 to 30 carbon atoms represented by $R^{11}$, $R^{12}$, $R^{13}$, $R^{21}$, $R^{22}$, $R^{23}$, and $R^{24}$ in the formula (1) include a phenyl group, a tolyl group, a xylyl group, an ethylphenyl group, a naphthyl group, an anthryl group, a phenanthryl group; and a phenyl group, a biphenylyl group, a naphthyl group, and an anthryl group substituted with one or more of the alkyl groups.

Examples of aralkyl groups having 7 to 30 carbon atoms represented by $R^{11}$, $R^{12}$, $R^{13}$, $R^{21}$, $R^{22}$, $R^{23}$, and $R^{24}$ in the formula (1) include a benzyl group, an α-methylbenzyl group, an α,α-dimethylbenzyl group, and a phenylethyl group.

Examples of the heterocyclic groups having 2 to 20 carbon atoms represented by $R^{11}$, $R^{12}$, $R^{13}$, $R^{21}$, $R^{22}$, $R^{23}$, and $R^{24}$ in the formula (1) include a pyridyl group, a pyrimidyl group, a furyl group, a thienyl group, a tetrahydrofuryl group, a dioxolanyl group, a benzoxazol-2-yl group, a tetrahydropyranyl group, a pyrrolidyl group, an imidazolidyl group, a pyrazolidyl group, a thiazolidyl group, an isothiazolidyl group, an oxazolidyl group, an isoxazolidyl group, a piperidyl group, a piperazyl group, and a morpholinyl group, and preferable is a 5- to 7-membered heterocyclic group.

$R^{12}$ and $R^{13}$ and $R^{22}$ and $R^{23}$ in the formula (1) are each optionally joined together to form a ring, meaning that $R^{12}$ and $R^{13}$ and $R^{22}$ and $R^{23}$ are each optionally joined together to form a ring together with a nitrogen atom, a carbon atom, or an oxygen atom to be connected.

Examples of the ring that can be formed by joining $R^{12}$ and $R^{13}$ and $R^{22}$ and $R^{23}$ in the formula (1) together include a cyclopentane ring, a cyclohexane ring, a cyclopentene ring, a benzene ring, a piperidine ring, a morpholine ring, a lactone ring, and a lactam ring, and preferable is a 5- to 7-membered ring.

Examples of the halogen atom that $R^{11}$, $R^{12}$, $R^{13}$, $R^{21}$, $R^{22}$, and $R^{23}$ in the formula (1) may have as a substituent include a fluorine atom, a chlorine atom, a bromine atom and an iodine atom.

$R^1$ in the formula (1) is preferably $R^{11}$, more preferably an alkyl group having 1 to 20 carbon atoms, still more preferably an alkyl group having 1 to 10 carbon atoms, and yet still more preferably an alkyl group having 1 to 6.

An example of the second molecular structure linked to the first molecular structure represented by the formula (1) is a structure represented by the following formula (2). The second molecular structure refers to a molecular structure portion of the oxime compound (1) other than the first molecular structure.

The bond represented by "*" in the formula (2) is directly bonded to the bond represented by "*" in the formula (1). That is, when the second molecular structure is a structure represented by the formula (2), the benzene ring having "—*" in the formula (2) and the carbonyl group having "—*" in the formula (1) are directly bonded to each other.

[Formula 9]

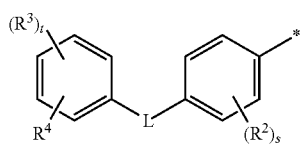

(2)

In the formula (2), $R^2$ and $R^3$ each independently represent $R^{11}$, $OR^{11}$, $SR^{11}$, $COR^{11}$, $CONR^{12}R^{13}$, $NR^{12}COR^{11}$, $OCOR^{11}$, $COOR^{11}$, $SCOR^{11}$, $OCSR^{11}$, $COSR^{11}$, $CSOR^{11}$, CN, or a halogen atom.

A plurality of $R^2$, when present, are optionally the same or different.

A plurality of $R^3$, when present, are optionally the same or different.

$R^{11}$, $R^{12}$, and $R^{13}$ have the same meaning as described above.

s and t each independently represent an integer of 0 to 4.

L represents a sulfur atom, $CR^{31}R^{32}$, CO, or $NR^{33}$.

$R^{31}$, $R^{32}$, and $R^{33}$ each independently represent a hydrogen atom, an alkyl group having 1 to 20 carbon atoms, an aryl group having 6 to 30 carbon atoms, or an aralkyl group having 7 to 30 carbon atoms.

When the group represented by $R^{31}$, $R^{32}$, or $R^{33}$ has an alkyl moiety, the alkyl moiety is optionally branched or cyclic, and $R^{31}$, $R^{32}$, and $R^{33}$ are each independently and optionally joined together to form a ring with any of adjacent benzene rings.

$R^4$ represents a hydroxy group, a carboxy group, or a group represented by the following formula (2-1):

[Formula 10]

(2-1)

(In the formula (2-1), $L^1$ represents —O—, —S—, —$NR^{22}$—, —$NR^{22}CO$—, —$SO_2$—, —CS—, —OCO—, or —COO—.

$R^{22}$ has the same meaning as described above.

$L^2$ represents a group obtained by removing v hydrogen atoms from an alkyl group having 1 to 20 carbon atoms, a group obtained by removing v hydrogen atoms from an aryl group having 6 to 30 carbon atoms, a group obtained by removing v hydrogen atoms from an aralkyl group having 7 to 30 carbon atoms, or a group obtained by removing v hydrogen atoms from a heterocyclic group having 2 to 20 carbon atoms.

When the group represented by $L^2$ has an alkylene moiety, the alkylene moiety is optionally interrupted one to five times by —O—, —S—, —COO—, —OCO—, —$NR^{22}$—, —$NR^{22}COO$—, —$OCONR^{22}$—, —SCO—, —COS—, —OCS—, or —CSO—, and the alkylene moiety is optionally branched or cyclic.

$R^{4a}$ is each independently $OR^{41}$, $SR^{41}$, $CONR^{42}R^{43}$, $NR^{42}COR^{43}$, $OCOR^{41}$, $COOR^{41}$, $SCOR^{41}$, $OCSR^{41}$, $COSR^{41}$, $CSOR^{41}$, CN, or a halogen atom.

A plurality of $R^{4a}$, when present, are optionally the same or different.

$R^{41}$, $R^{42}$, and $R^{43}$ each independently represent a hydrogen atom, an alkyl group having 1 to 20 carbon atoms, an aryl group having 6 to 30 carbon atoms, or an aralkyl group having 7 to 30 carbon atoms, and when the group represented by $R^{41}$, $R^{42}$, and $R^{43}$ has an alkyl moiety, the alkyl moiety is optionally branched or cyclic, and $R^{42}$ and $R^{43}$ are optionally joined together to form a ring.

v represents an integer of 1 to 3.)

* represents a bond with the first molecular structure of the oxime compound (1).

Examples of alkyl groups having 1 to 20 carbon atoms, aryl groups having 6 to 30 carbon atoms, and aralkyl groups having 7 to 30 carbon atoms represented by $R^{11}$, $R^{12}$, $R^{13}$, $R^{21}$, $R^{22}$, $R^{23}$, $R^{24}$, $R^{31}$, $R^{32}$, and $R^{33}$ in the formula (2) and $R^{22}$, $R^{41}$, $R^{42}$, and $R^{43}$ in the formula (2-1) are the same as examples for $R^{11}$, $R^{12}$, $R^{13}$, $R^{21}$, $R^{22}$, $R^{23}$, and $R^{24}$ in the formula (1).

Examples of heterocyclic groups having 2 to 20 carbon atoms represented by $R^{11}$, $R^{12}$, $R^{13}$, $R^{21}$, $R^{22}$, $R^{23}$, and $R^{24}$ in the formula (2) and $R^{22}$ in the formula (2-1) are the same as examples for $R^{11}$, $R^{12}$, $R^{13}$, $R^{21}$, $R^{22}$, $R^{23}$, and $R^{24}$ in the formula (1).

$R^{31}$, $R^{32}$, and $R^{33}$ in the formula (2) are each independently and optionally joined together to form a ring with any of adjacent benzene rings, meaning that $R^{31}$, $R^{32}$, and $R^{33}$ are each independently and optionally joined together to form a ring with any of adjacent benzene rings together with a nitrogen atom to be connected.

Examples of the ring which can be formed by joining $R^{31}$, $R^{32}$, and $R^{33}$ in the formula (2) together with any of adjacent benzene rings are the same as those of the ring which can be formed by joining $Ra^{12}$ and $Ra^{13}$ and $Ra^{22}$ and $Ra^{23}$ in the formula (1) together.

$L^2$ in the above formula (2-1) represents groups obtained by removing v hydrogen atoms from an alkyl group having 1 to 20 carbon atoms, an aryl group having 6 to 30 carbon atoms, an aralkyl group having 7 to 30 carbon atoms, or a heterocyclic group having 2 to 20 carbon atoms.

Examples of the group obtained by removing v hydrogen atoms from an alkyl group having 1 to 20 carbon atoms when v is 1 include alkylene groups such as a methylene group, an ethylene group, a propylene group, a methylethylene group, a butylene group, a 1-methylpropylene group, a 2-methylpropylene group, a 1,2-dimethylpropylene group, a 1,3-dimethylpropylene group, a 1-methylbutylene group, a 2-methylbutylene group, a 3-methylbutylene group, a 4-methylbutylene group, a 2,4-dimethylbutylene group, a 1,3-dimethylbutylene group, a pentylene group, a hexylene group, a heptylene group, an octylene group, a nonylene group, a decylene group, a dodecylene group, a tridecylene group, a tetradecylene group, a pentadecylene group, an ethane-1,1-diyl group, and a propane-2,2-diyl group.

Examples of the group obtained by removing v hydrogen atoms from an aryl group having 6 to 30 carbon atoms when v is 1 include arylene groups such as a 1,2-phenylene group, 1,3-phenylene group, and a 1,4-phenylene group, a 2,6-naphthylene group, a 1,4-naphthylene group, a 2,5-dimethyl-1,4-phenylene group, a diphenylmethane-4,4'-diyl group, a 2,2-diphenylpropane-4,4'-diyl group, a diphenylsulfide-4,4'-diyl group, and a diphenylsulfon-4,4'-diyl group.

Examples of the group obtained by removing v hydrogen atoms from an aralkyl group having 7 to 30 carbon atoms when v is 1 include a group represented by the following formula (a) and a group represented by the following formula (b).

[Formula 11]

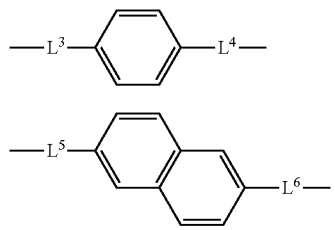

(a)

(b)

[In the formulas (a) and (b), $L^3$ and $L^5$ represent an alkylene group having 1 to 10 carbon atoms, and $L^4$ and $L^6$ represent a single bond or an alkylene group having 1 to 10 carbon atoms.]

Examples of the alkylene group having 1 to 10 carbon atoms include alkylene groups such as a methylene group, an ethylene group, a propylene group, a methylethylene group, a butylene group, a 1-methylpropylene group, a 2-methylpropylene group, a 1,2-dimethylpropylene group, a 1,3-dimethylpropylene group, a 1-methylbutylene group, a 2-methylbutylene group, a 3-methylbutylene group, a 4-methylbutylene group, a 2,4-dimethylbutylene group, a 1,3-dimethylbutylene group, a pentylene group, a hexylene group, a heptylene group, an octylene group, a nonylene group, and a decylene group.

Examples of the group obtained by removing v hydrogen atoms from a heterocyclic group having 2 to 20 carbon atoms when v is 1 include divalent heterocyclic groups such as a 2,5-pyridinediyl group, a 2,6-pyridinediyl group, a 2,5-pyrimidinediyl group, a 2,5-thiophenediyl group, a 3,4-tetrahydrofurandiyl group, a 2,5-tetrahydrofurandiyl group, a 2,5-furandiyl group, a 3,4-thiazolediyl group, a 2,5-benzofurandiyl group, a 2,5-benzothiophenediyl group, an N-methylindole-2,5-diyl group, a 2,5-benzothiazolediyl group, and a 2,5-benzoxazolediyl group.

Examples of the halogen atom represented by $R^2$ and $R^3$ in the formula (2) and $R^{4a}$ in the formula (2-1) include a fluorine atom, a chlorine atom, a bromine atom and an iodine atom.

From the viewpoint of solubility in the solvent (G) and/or the development speed of the curable resin composition, a preferable example of the structure represented by the formula (2) is the structure represented by the following formula (2a):

[Formula 12]

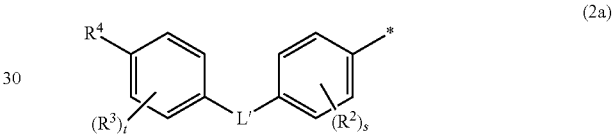

[In the formula (2a), L' represents a sulfur atom or $NR^{50}$, $R^{50}$ represents a linear, branched, or cyclic alkyl group having 1 to 20 carbon atoms, and $R^2$, $R^3$, $R^4$, s, and t have the same meaning as described above.]

From the same viewpoint as above, another preferable example of the structure represented by the formula (2) is the structure represented by the following formula (2b):

[Formula 13]

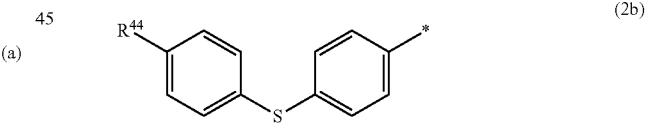

[In the formula (2b), $R^{44}$ represents a hydroxy group, a carboxy group, or a group represented by the following formula (2-2):

[Formula 14]

$$R^{44a}\text{-}L^{12}\text{-}L^{11}\text{-} \quad (2\text{-}2)$$

(In the formula (2-2), $L^{11}$ represents —O— or *—OCO—, * represents a bond to $L^{12}$, $L^{12}$ represents an alkylene group having 1 to 20 carbon atoms, the alkylene group may be interrupted by one to three —O—, $R^{44a}$ represents $OR^{55}$ or $COOR^{55}$, $R^{55}$ represents a hydrogen atom or an alkyl group having 1 to 6 carbon atoms.).]

$R^{44}$ is preferably a group represented by the formula (2-2). In this case, it is advantageous in terms of the solubility of the oxime compound (1) in the solvent (G) and the development speed of the curable resin composition.

The number of carbon atoms of the alkylene group represented by $L^{12}$ is preferably 1 to 10, and more preferably 1 to 4.

$R^{44a}$ is preferably a hydroxy group or a carboxy group, and more preferably a hydroxy group.

The method for producing the oxime compound (1) having the second molecular structure represented by the formula (2) is not particularly limited, but the oxime compound (1) can be produced by the method disclosed in Japanese Patent Laid-Open No. 2011-132215.

Another example of the second molecular structure linked to the first molecular structure represented by the formula (1) is a structure represented by the following formula (3).

The bond represented by "*" in the formula (3) is directly bonded to the bond represented by "*" in the formula (1). That is, when the second molecular structure is a structure represented by the formula (3), the benzene ring having "—*" in the formula (3) and the carbonyl group having "—*" in the formula (1) are directly bonded to each other.

[Formula 15]

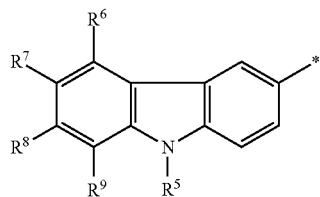

(3)

In the formula (3), $R^5$ represents a hydrogen atom, an alkyl group having 1 to 20 carbon atoms, an aryl group having 6 to 30 carbon atoms, an arylalkyl group having 7 to 30 carbon atoms, or a heterocyclic group having 2 to 20 carbon atoms.

When the group represented by $R^5$ has an alkyl moiety, the alkyl moiety is optionally branched or cyclic.

The hydrogen atoms of the group represented by $R^5$ are optionally replaced by $R^{21}$, $OR^{21}$, $COR^{21}$, $SR^{21}$, $NR^{22}R^{23}$, $CONR^{22}R^{23}$, —$NR^{22}$—$OR^{23}$, —$N(COR^{22})$—$OCOR^{23}$, $NR^{22}COR^{21}$, $OCOR^{21}$, $COOR^{21}$, —$C(=N-OR^{21})$—$R^{22}$, —$C(=N-OCOR^{21})$—$R^{22}$, $SCOR^{21}$, $OCSR^{21}$, $COSR^{21}$, $CSOR^{21}$, a hydroxyl group, a nitro group, CN, a halogen atom, or $COOR^{21}$.

$R^{21}$, $R^{22}$, and $R^{23}$ have the same meaning as described above.

The hydrogen atoms of the group represented by $R^{21}$, $R^{22}$, or $R^{23}$ are optionally replaced by CN, a halogen atom, a hydroxy group, or a carboxy group.

When the group represented by $R^{21}$, $R^{22}$, and $R^{23}$ has an alkylene moiety, the alkylene moiety is optionally interrupted one to five times by —O—, —S—, —COO—, —OCO—, —$NR^{24}$—, —$NR^{24}CO$—, —$NR^{24}COO$—, —$OCONR^{24}$—, —SCO—, —COS—, —OCS—, or —CSO—.

$R^{24}$ has the same meaning as described above.

When the group represented by $R^{21}$, $R^{22}$, and $R^{23}$ has an alkyl moiety, the alkyl moiety is optionally branched or cyclic, and $R^{22}$ and $R^{23}$ are optionally joined together to form a ring.

$R^6$, $R^7$, $R^8$, and $R^9$ are each independently $R^{61}$, $OR^{61}$, $SR^{61}$, $COR^{62}$, $CONR^{63}R^{64}$, $NR^{65}COR^{61}$, $COR^{61}$, $COOR^{62}$, $SCOR^{61}$, $OCSR^{61}$, $COSR^{62}$, $CSOR^{61}$, a hydroxy group, a nitro group, CN, or a halogen atom.

$R^{61}$, $R^{62}$, $R^{63}$, $R^{64}$, and $R^{65}$ each independently represent a hydrogen atom, an alkyl group having 1 to 20 carbon atoms, an aryl group having 6 to 30 carbon atoms, an arylalkyl group having 7 to 30 carbon atoms, or a heterocyclic group having 2 to 20 carbon atoms.

The hydrogen atoms of the group represented by $R^{61}$, $R^{62}$, $R^{63}$, $R^{64}$, or $R^{65}$ are optionally replaced by $OR^{21}$, $COR^{21}$, $SR^{21}$, $NR^{22}Ra^{23}$, $CONR^{22}R^{23}$, —$NR^{22}$—$OR^{23}$, —$N(COR^{22})$—$OCOR^{23}$, —$C(=N-OR^{21})$—$R^{22}$, —$C(=N-OCOR^{21})$—$R^{22}$, CN, a halogen atom, or $COOR^{21}$.

$R^6$ and $R^7$, $R^7$ and $R^8$, and $R^8$ and $R^9$ are each optionally joined together to form a ring.

* represents a bond with the first molecular structure of the oxime compound (1).

Examples of alkyl groups having 1 to 20 carbon atoms, aryl groups having 6 to 30 carbon atoms, aralkyl groups having 7 to 30 carbon atoms, and heterocyclic groups having 2 to 20 carbon atoms represented by $R^5$, $R^{21}$, $R^{22}$, $R^{23}$, $R^{24}$, $R^{61}$, $R^{62}$, $R^{63}$, $R^{64}$, and $R^{65}$ in the formula (3) are the same as examples for $R^{11}$, $R^{12}$, $R^{13}$, $R^{21}$, $R^{22}$, $R^{23}$, and $R^{24}$ in the formula (1).

$R^{22}$ and $R^{23}$ in the formula (3) are each optionally joined together to form a ring, meaning that $R^{22}$ and $R^{23}$ are each optionally joined together to form a ring together with a nitrogen atom, a carbon atom, or an oxygen atom to be connected.

Examples of the ring which can be formed by joining $R^{22}$ and $R^{23}$ in the formula (3) together are the same as those of the ring which can be formed by joining $Ra^{12}$ and $Ra^{18}$, and $Ra^{22}$ and $Ra^{23}$ in the formula (1) together.

Examples of the halogen atom represented by $R^6$, $R^7$, $R^8$, and $R^9$, and the halogen atoms which may replace the hydrogen atoms of $R^5$, $R^{21}$, $R^{22}$, $R^{23}$, $R^{61}$, $R^{62}$, $R^{63}$, $R^{64}$, and $R^{65}$ in the formula (3) include a fluorine atom, a chlorine atom, a bromine atom and an iodine atom.

From the viewpoint of solubility in the solvent (G) and/or the development speed of the curable resin composition, in one preferable embodiment, $R^5$ is a group represented by the following formula (3-1):

[Formula 16]

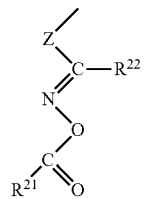

(3-1)

[In the formula (3-1), Z represents a group obtained by removing one hydrogen atom from an alkyl group having 1 to 20 carbon atoms, a group obtained by removing one hydrogen atom from an aryl group having 6 to 30 carbon atoms, a group obtained by removing one hydrogen atom from an aralkyl group having 7 to 30 carbon atoms, or a group obtained by removing one hydrogen atom from a heterocyclic group having 2 to 20 carbon atoms.

When the group represented by Z has an alkylene moiety, the alkylene moiety is optionally interrupted one to five times by —O—, —S—, —COO—, —OCO—, —$NR^{24}$—, —$NR^{24}COO$—, —$OCONR^{24}$—, —SCO—, —COS—, —OCS—, or —CSO—, and the alkylene moiety is optionally branched or cyclic.

$R^{21}$, $R^{22}$, and $R^{24}$ have the same meaning as described above.]

From the same viewpoint as above, Z in the formula (3-1) is preferably a methylene group, an ethylene or phenylene group.

From the same viewpoint as above, $R^{21}$ and $R^{22}$ in the formula (3-1) are preferably an alkyl group having 1 to 20 carbon atoms or an aryl group having 6 to 30 carbon atoms, and more preferably a methyl group, an ethyl group, or a phenyl group.

From the same viewpoint as above, in another preferred embodiment, $R^7$ is a nitro group.

The method for producing the oxime compound (1) having the second molecular structure represented by the formula (3) is not particularly limited, but the oxime compound (1) can be produced by the method disclosed in Japanese Patent Laid-Open No. 2000-80068 and Japanese Patent Laid-Open No. 2011-178776.

Yet another example of the second molecular structure linked to the first molecular structure represented by the formula (1) is a structure represented by the following formula (4).

The bond represented by "*" in the formula (4) is directly bonded to the bond represented by "*" in the formula (1). That is, when the second molecular structure is a structure represented by the formula (4), the benzene ring having "—*" in the formula (4) and the carbonyl group having "—*" in the formula (1) are directly bonded to each other.

[Formula 17]

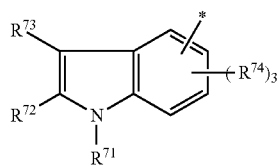

(4)

In the formula (4), $R^{71}$ represents a hydrogen atom, an alkyl group having 1 to 20 carbon atoms, an aryl group having 6 to 30 carbon atoms, an aralkyl group having 7 to 30 carbon atoms, or a heterocyclic group having 2 to 20 carbon atoms.

When the group represented by $R^{71}$ has an alkyl moiety, the alkyl moiety is optionally branched or cyclic.

The hydrogen atoms of the group represented by $R^{71}$ are optionally replaced by $R^{21}$, $OR^{21}$, $COR^{21}$, $SR^{21}$, $NR^{22}R^{23}$, $CONR^{22}R^{23}$, $-NR^{22}-OR^{23}$, $-N(COR^{22})-OCOR^{23}$, $NR^{22}COR^{21}$, $OCOR^{21}$, $COOR^{21}$, $-C(=N-OR^{21})-R^{22}$, $-C(=N-OCOR^{21})-R^{22}$, $SCOR^{21}$, $OCSR^{21}$, $COSR^{21}$, $CSOR^{21}$, a hydroxyl group, a nitro group, CN, a halogen atom, or $COOR^{21}$.

$R^{21}$, $R^{22}$, and $R^{23}$ have the same meaning as described above.

The hydrogen atoms of the group represented by $R^{21}$, $R^{22}$, or $R^{23}$ are optionally replaced by CN, a halogen atom, a hydroxy group, or a carboxy group.

When the group represented by $R^{21}$, $R^{22}$, and $R^{23}$ has an alkylene moiety, the alkylene moiety is optionally interrupted one to five times by —O—, —S—, —COO—, —OCO—, —NR$^{24}$—, —NR$^{24}$CO—, —NR$^{24}$COO—, —OCONR$^{24}$—, —SCO—, —COS—, —OCS—, or —CSO—.

$R^{24}$ has the same meaning as described above.

When the group represented by $R^{21}$, $R^{22}$, and $R^{23}$ has an alkyl moiety, the alkyl moiety is optionally branched or cyclic, and $R^{22}$ and $R^{23}$ are optionally joined together to form a ring.

$R^{72}$, $R^{73}$, and three $R^{74}$ each independently represent $R^{61}$, $OR^{61}$, $SR^{61}$, $COR^{62}$, $CONR^{63}R^{64}$, $NR^{65}COR^{61}$, $OCOR^{61}$, $COOR^{62}$, $SCOR^{61}$, $OCSR^{61}$, $COSR^{62}$, $CSOR^{61}$, a hydroxy group, a nitro group, CN, or a halogen atom.

$R^{61}$, $R^{62}$, $R^{63}$, $R^{64}$, and $R^{65}$ each independently represent a hydrogen atom, an alkyl group having 1 to 20 carbon atoms, an aryl group having 6 to 30 carbon atoms, an arylalkyl group having 7 to 30 carbon atoms, or a heterocyclic group having 2 to 20 carbon atoms.

The hydrogen atoms of the group represented by $R^{61}$, $R^{62}$, $R^{63}$, $R^{64}$, or $R^{65}$ are optionally replaced by $OR^{21}$, $COR^{21}$, $SR^{21}$, $NR^{22}Ra^{23}$, $CONR^{22}R^{23}$, $-NR^{22}-OR^{23}$, $-N(COR^{22})-OCOR^{23}$, $-C(=N-OR^{21})-R^{22}$, $-C(=N-OCOR^{21})-R^{22}$, CN, a halogen atom, or $COOR^{21}$.

$R^{72}$ and $R^{73}$ and two $R^{74}$ are each optionally joined together to form a ring.

* represents a bond with the first molecular structure of the oxime compound (1).

Examples of alkyl groups having 1 to 20 carbon atoms, aryl groups having 6 to 30 carbon atoms, aralkyl groups having 7 to 30 carbon atoms, and heterocyclic groups having 2 to 20 carbon atoms represented by $R^{71}$, $R^{21}$, $R^{22}$, $R^{23}$, $R^{24}$, $R^{61}$, $R^{62}$, $R^{63}$, $R^{64}$, and $R^{65}$ in the formula (4) are the same as examples for $R^{11}$, $R^{12}$, $R^{13}$, $R^{21}$, $R^{22}$, $R^{23}$, and $R^{24}$ in the formula (1).

$R^{22}$ and $R^{23}$ in the formula (4) are each optionally joined together to form a ring, meaning that $R^{22}$ and $R^{23}$ are each optionally joined together to form a ring together with a nitrogen atom, a carbon atom, or an oxygen atom to be connected.

Examples of the ring which can be formed by joining $R^{22}$ and $R^{23}$ in the formula (4) together are the same as those of the ring which can be formed by joining $Ra^{12}$ and $Ra^{13}$, and $Ra^{22}$ and $Ra^{23}$ in the formula (1) together.

Examples of the halogen atom represented by $R^{72}$, $R^{73}$, and $R^{74}$, and the halogen atoms which may replace the hydrogen atoms of $R^{71}$, $R^{21}$, $R^{22}$, $R^{23}$, $R^{61}$, $R^{62}$, $R^{63}$, $R^{64}$, and $R^{65}$ in the formula (4) include a fluorine atom, a chlorine atom, a bromine atom and an iodine atom.

The method for producing the oxime compound (1) having the second molecular structure represented by the formula (4) is not particularly limited, but the oxime compound (1) can be produced by the method disclosed in International Publication No. 2017/051680 and International Publication No. 2020/004601.

Yet another example of the second molecular structure linked to the first molecular structure represented by the formula (1) is a structure represented by the following formula (5).

The bond represented by "*" in the formula (5) is directly bonded to the bond represented by "*" in the formula (1). That is, when the second molecular structure is a structure represented by the formula (5), the pyrrole ring having "—*" in the formula (5) and the carbonyl group having "—*" in the formula (1) are directly bonded to each other.

[Formula 18]

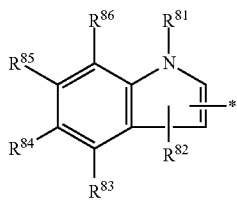

(5)

In the formula (5), $R^{81}$ represents a hydrogen atom, an alkyl group having 1 to 20 carbon atoms, an aryl group having 6 to 30 carbon atoms, an aralkyl group having 7 to 30 carbon atoms, or a heterocyclic group having 2 to 20 carbon atoms.

When the group represented by $R^{81}$ has an alkyl moiety, the alkyl moiety is optionally branched or cyclic.

The hydrogen atoms of the group represented by $R^{81}$ are optionally replaced by $R^{21}$, $OR^{21}$, $COR^{21}$, $SR^{21}$, $NR^{22}R^{23}$, $CONR^{22}R^{23}$, $-NR^{22}-OR^{23}$, $-N(COR^{22})-OCOR^{23}$, $NR^{22}COR^{21}$, $OCOR^{21}$, $COOR^{21}$, $-C(=N-OR^{21})-R^{22}$, $-C(=N-OCOR^{21})-R^{22}$, $SCOR^{21}$, $OCSR^{21}$, $COSR^{21}$, $CSOR^{21}$, a hydroxyl group, a nitro group, CN, a halogen atom, or $COOR^{21}$.

$R^{21}$, $R^{22}$, and $R^{23}$ have the same meaning as described above.

The hydrogen atoms of the group represented by $R^{21}$, $R^{22}$, or $R^{23}$ are optionally replaced by CN, a halogen atom, a hydroxy group, or a carboxy group.

When the group represented by $R^{21}$, $R^{22}$, and $R^{23}$ has an alkylene moiety, the alkylene moiety is optionally interrupted one to five times by $-O-$, $-S-$, $-COO-$, $-OCO-$, $-NR^{24}-$, $-NR^{24}CO-$, $-NR^{24}COO-$, $-OCONR^{24}-$, $-SCO-$, $-COS-$, $-OCS-$, or $-CSO-$.

$R^{24}$ has the same meaning as described above.

When the group represented by $R^{21}$, $R^{22}$, and $R^{23}$ has an alkyl moiety, the alkyl moiety is optionally branched or cyclic, and $R^{22}$ and $R^{23}$ are optionally joined together to form a ring.

$R^{82}$, $R^{83}$, $R^{84}$, $R^{85}$, and $R^{86}$ are each independently $R^{61}$, $OR^{61}$, $SR^{61}$, $COR^{62}$, $CONR^{63}R^{64}$, $NR^{65}COR^{61}$, $OCOR^{61}$, $COOR^{62}$, $SCOR^{61}$, $OCSR^{61}$, $COSR^{62}$, $CSOR^{61}$, a hydroxy group, a nitro group, CN, or a halogen atom.

$R^{61}$, $R^{62}$, $R^{63}$, $R^{64}$, and $R^{65}$ each independently represent a hydrogen atom, an alkyl group having 1 to 20 carbon atoms, an aryl group having 6 to 30 carbon atoms, an arylalkyl group having 7 to 30 carbon atoms, or a heterocyclic group having 2 to 20 carbon atoms.

The hydrogen atoms of the group represented by $R^{61}$, $R^{62}$, $R^{63}$, $R^{64}$, or $R^{65}$ are optionally replaced by $OR^{21}$, $COR^{21}$, $SR^{21}$, $NR^{22}Ra^{23}$, $CONR^{22}R^{23}$, $-NR^{22}-OR^{23}$, $-N(COR^{22})-OCOR^{23}$, $-C(=N-OR^{21})-R^{22}$, $-C(=N-OCOR^{21})-R^{22}$, CN, a halogen atom, or $COOR^{21}$.

$R^{83}$ and $R^{84}$, $R^{84}$ and $R^{85}$, and $R^{85}$ and $R^{86}$ are each optionally joined together to form a ring.

* represents a bond with the first molecular structure of the oxime compound (1).

Examples of alkyl groups having 1 to 20 carbon atoms, aryl groups having 6 to 30 carbon atoms, aralkyl groups having 7 to 30 carbon atoms, and heterocyclic groups having 2 to 20 carbon atoms represented by $R^{81}$, $R^{21}$, $R^{22}$, $R^{23}$, $R^{24}$, $R^{61}$, $R^{62}$, $R^{63}$, $R^{64}$, and $R^{65}$ in the formula (5) are the same as examples for $R^{11}$, $R^{12}$, $R^{13}$, $R^{21}$, $R^{22}$, $R^{23}$, and $R^{24}$ in the formula (1).

$R^{22}$ and $R^{23}$ in the formula (5) are each optionally joined together to form a ring, meaning that $R^{22}$ and $R^{23}$ are each optionally joined together to form a ring together with a nitrogen atom, a carbon atom, or an oxygen atom to be connected.

Examples of the ring which can be formed by joining $R^{22}$ and $R^{23}$ in the formula (5) together are the same as those of the ring which can be formed by joining $Ra^{12}$ and $Ra^{13}$, and $Ra^{22}$ and $Ra^{23}$ in the formula (1) together.

Examples of the halogen atom represented by $R^{82}$, $R^{83}$, $R^{84}$, $R^{85}$, and $R^{86}$, and the halogen atoms which may replace the hydrogen atoms of $R^{81}$, $R^{21}$, $R^{22}$, $R^{23}$, $R^{61}$, $R^{62}$, $R^{63}$, $R^{64}$, and $R^{65}$ in the formula (5) include a fluorine atom, a chlorine atom, a bromine atom and an iodine atom.

The method for producing the oxime compound (1) having the second molecular structure represented by the formula (5) is not particularly limited, but the oxime compound (1) can be produced by the method disclosed in International Publication No. 2017/051680 and International Publication No. 2020/004601.

Yet another example of the second molecular structure linked to the first molecular structure represented by the formula (1) is a structure represented by the following formula (6).

The bond represented by "*" in the formula (6) is directly bonded to the bond represented by "*" in the formula (1). That is, when the second molecular structure is a structure represented by the formula (6), the benzene ring having "—*" in the formula (6) and the carbonyl group having "—*" in the formula (1) are directly bonded to each other.

[Formula 19]

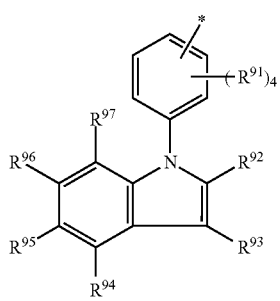

(6)

In the formula (6), four $R^{91}$, $R^{92}$, $R^{93}$, $R^{94}$, $R^{95}$, $R^{96}$, and $R^{97}$ are each independently $R^{61}$, $OR^{61}$, $SR^{61}$, $COR^{62}$, $CONR^{63}R^{64}$, $NR^{65}COR^{61}$, $OCOR^{61}$, $COOR^{62}$, $SCOR^{61}$, $OCSR^{61}$, $COSR^{62}$, $CSOR^{61}$, a hydroxy group, a nitro group, CN, or a halogen atom.

$R^{61}$, $R^{62}$, $R^{63}$, $R^{64}$, and $R^{65}$ each independently represent a hydrogen atom, an alkyl group having 1 to 20 carbon atoms, an aryl group having 6 to 30 carbon atoms, an arylalkyl group having 7 to 30 carbon atoms, or a heterocyclic group having 2 to 20 carbon atoms.

The hydrogen atoms of the group represented by $R^{61}$, $R^{62}$, $R^{63}$, $R^{64}$, or $R^{65}$ are optionally replaced by $OR^{21}$, $COR^{21}$, $SR^{21}$, $NR^{22}Ra^{23}$, $CONR^{22}R^{23}$, $-NR^{22}-OR^{23}$, $-N(COR^{22})-OCOR^{23}$, $-C(=N-OR^{21})-R^{22}$, $-C(=N-OCOR^{21})-R^{22}$, CN, a halogen atom, or $COOR^{21}$.

$R^{21}$, $R^{22}$, and $R^{23}$ have the same meaning as described above.

$R^{92}$ and $R^{93}$, $R^{94}$ and $R^{95}$, $R^{95}$ and $R^{96}$, and $R^{96}$ and $R^{97}$ are each optionally joined together to form a ring.

* represents a bond with the first molecular structure of the oxime compound (1).

Examples of alkyl groups having 1 to 20 carbon atoms, aryl groups having 6 to 30 carbon atoms, aralkyl groups having 7 to 30 carbon atoms, and heterocyclic groups having 2 to 20 carbon atoms represented by $R^{21}$, $R^{22}$, $R^{23}$, $R^{61}$, $R^{62}$, $R^{63}$, $R^{64}$, and $R^{65}$ in the formula (6) are the same as examples for $R^{11}$, $R^{12}$, $R^{13}$, $R^{21}$, $R^{22}$, and $R^{23}$ in the formula (1).

$R^{22}$ and $R^{23}$ in the formula (6) are each optionally joined together to form a ring, meaning that $R^{22}$ and $R^{23}$ are each optionally joined together to form a ring together with a nitrogen atom, a carbon atom, or an oxygen atom to be connected.

Examples of the ring which can be formed by joining $R^{22}$ and $R^{23}$ in the formula (6) together are the same as those of the ring which can be formed by joining $Ra^{12}$, and $Ra^{13}$ and $Ra^{22}$ and $Ra^{23}$ in the formula (1) together.

Examples of the halogen atom represented by $R^{91}$, $R^{92}$, $R^{93}$, $R^{94}$, $R^{95}$, $R^{96}$, and $R^{97}$, and the halogen atoms which may replace the hydrogen atoms of $R^{21}$, $R^{22}$, $R^{23}$, $R^{61}$, $R^{62}$, $R^{63}$, $R^{64}$, and $R^{65}$ in the formula (6) include a fluorine atom, a chlorine atom, a bromine atom and an iodine atom.

The method for producing the oxime compound (1) having the second molecular structure represented by the formula (6) is not particularly limited, but the oxime compound (1) can be produced by the method disclosed in International Publication No. 2017/051680 and International Publication No. 2020/004601.

The photopolymerization initiator (E) may further contain another photopolymerization initiator other than the oxime compound (1).

Examples of the other photopolymerization initiator include oxime compounds other than the oxime compound (1), biimidazole compounds, triazine compounds and acylphosphine compounds.

Examples of the oxime compound other than the oxime compound (1) include an oxime compound having a partial structure represented by the following formula (d1). * represents a bond.

[Formula 20]

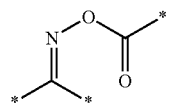

(d1)

Examples of the oxime compound having a partial structure represented by the formula (d1) include N-benzoyloxy-1-(4-phenylsulfanylphenyl)butan-1-one-2-imine, N-benzoyloxy-1-(4-phenylsulfanylphenyl)octan-1-one-2-imine, N-benzoyloxy-1-(4-phenylsulfanylphenyl)-3-cyclopentylpropan-1-one-2-imine, N-acetoxy-1-[9-ethyl-6-(2-methylbenzoyl)-9H-carbazole-3-yl]ethane-1-imine, N-acetoxy-1-[9-ethyl-6-{2-methyl-4-(3,3-dimethyl-2,4-dioxacyclopentanylmethyloxy)benzoyl}-9H-carbazole-3-yl]ethane-1-imine, N-acetoxy-1-[9-ethyl-6-(2-methylbenzoyl)-9H-carbazole-3-yl]-3-cyclopentylpropane-1-imine, and N-benzoyloxy-1-[9-ethyl-6-(2-methylbenzoyl)-9H-carbazole-3-yl]-3-cyclopentylpropan-1-one-2-imine, and compounds disclosed in Japanese Patent Laid-Open No. 2011-132215, International Publication No. 2008/78678, International Publication No. 2008/78686, and International Publication No. 2012/132558. Commercially available products such as Irgacure OXE01 and Irgacure OXE02 (all manufactured by BASF Japan Ltd.), and N-1919 (manufactured by ADEKA Corporation) may also be used.

Of these, the oxime compound having a partial structure represented by the formula (d1) is preferably at least one selected from the group consisting of N-benzoyloxy-1-(4-phenylsulfanylphenyl)butan-1-one-2-imine, N-benzoyloxy-1-(4-phenylsulfanylphenyl)octan-1-one-2-imine, and N-benzoyloxy-1-(4-phenylsulfanylphenyl)-3-cyclopentylpropan-1-one-2-imine, and more preferably N-benzoyloxy-1-(4-phenylsulfanylphenyl)octan-1-one-2-imine.

Examples of the biimidazole compound include a compound represented by the formula (d5):

[Formula 21]

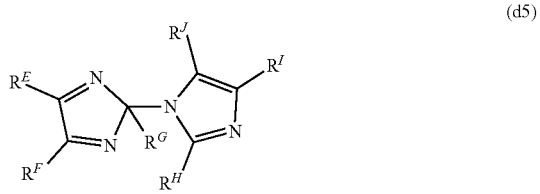

(d5)

[In the formula (d5), $R^E$ to $R^J$ represent an aryl group having 6 to 10 carbon atoms which may have a substituent.]

Examples of the aryl group having 6 to 10 carbon atoms include a phenyl group, a toluyl group, a xylyl group, an ethylphenyl group, and a naphthyl group, and preferable is a phenyl group.

Examples of the substituent include a halogen atom and an alkoxy group having 1 to 4 carbon atoms. Examples of the halogen atom include a fluorine atom, a chlorine atom, a bromine atom and an iodine atom, and preferable is a chlorine atom. Examples of the alkoxy group having 1 to 4 carbon atoms include a methoxy group, an ethoxy group, a propoxy group, and a butoxy group, and preferable is a methoxy group.

Examples of the biimidazole compound include 2,2'-bis(2-chlorophenyl)-4,4',5,5'-tetraphenylbiimidazole, 2,2'-bis(2,3-dichlorophenyl)-4,4',5,5'-tetraphenylbiimidazole (for example, see Japanese Patent Laid-Open No. 06-75372 and Japanese Patent Laid-Open No. 06-75373), 2,2'-bis(2-chlorophenyl)-4,4',5,5'-tetraphenyl biimidazole, 2,2'-bis(2-chlorophenyl)-4,4',5,5'-tetra(alkoxyphenyl)biimidazole, 2,2'-bis(2-chlorophenyl)-4,4',5,5'-tetra(dialkoxyphenyl) biimidazole, 2,2'-bis(2-chlorophenyl)-4,4',5,5'-tetra(trialkoxyphenyl)biimidazole (for example, see Japanese Patent No. 48-38403 and Japanese Patent Laid-Open No. 62-174204), and an imidazole compound in which phenyl groups at the 4,4',5,5' positions are each substituted with a carboalkoxy group (for example, see Japanese Patent Laid-Open No. 7-10913). Of these, a compound represented by the following formula or a mixture thereof is preferable.

[Formula 22]

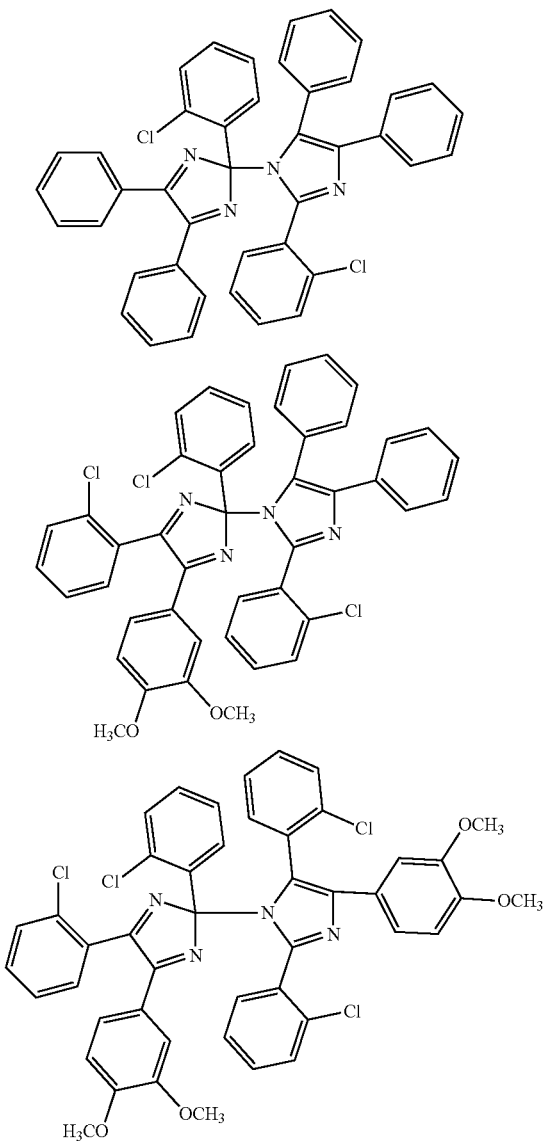

Examples of the triazine compound include 2,4-bis(trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-piperonyl-1,3,5-triazine, 2,4-bis(trichloromethyl)-6-(4-methoxystyryl)-1,3,5-triazine, 2,4-bis(trichloromethyl)-6-[2-(5-methylfuran-2-yl)ethenyl]-1,3,5-triazine, 2,4-bis(trichloromethyl)-6-[2-(furan-2-yl)ethenyl]-1,3,5-triazine, 2,4-bis(trichloromethyl)-6-[2-(4-diethylamino-2-methylphenyl)ethenyl]-1,3,5-triazine, and 2,4-bis(trichloromethyl)-6-[2-(3,4-dimethoxyphenyl)ethenyl]-1,3,5-triazine. Of these, 2,4-bis(trichloromethyl)-6-piperonyl-1,3,5-triazine is preferable.

Examples of the acylphosphine compound include bis(2,4,6-trimethylbenzoyl)phenylphosphine oxide and (2,4,6-trimethylbenzoyl)diphenylphosphine oxide.

Other examples of the other photopolymerization initiator other than the oxime compound (1) include benzoin compounds such as benzoin, benzoin methyl ether, benzoin ethyl ether, benzoin isopropyl ether, and benzoin isobutyl ether; benzophenone compounds such as benzophenone, methyl o-benzoylbenzoate, 4-phenylbenzophenone, 4-benzoyl-4'-methyldiphenyl sulfide, 3,3',4,4'-tetra(tert-butylperoxycarbonyl)benzophenone, 2,4,6-trimethylbenzophenone, and 4,4'-bis(diethylamino)benzophenone; quinone compounds such as 9,10-phenanthrene quinone, 2-ethylanthraquinone, and camphorquinone; 10-butyl-2-chloroacridone, benzyl, methyl phenylglyoxylate, and a titanocene compound.

Only one photopolymerization initiator other than the oxime compound (1) may be used alone, or two or more photopolymerization initiators may be used in combination. When a photopolymerization initiator other than the oxime compound (1) is used in combination with the oxime compound (1), the other photopolymerization initiator may be an oxime compound other than the oxime compound (1) described above, a biimidazole compound, a triazine compound, an acylphosphine compound, or the like.

The content of the photopolymerization initiator (E) in the curable resin composition is preferably 0.1 parts by mass or more and 300 parts by mass or less, and more preferably 0.1 parts by mass or more and 200 parts by mass or less, based on 100 parts by mass of the photopolymerizable compound (D). Further, the content of the photopolymerization initiator (E) in the curable resin composition is preferably 0.1 parts by mass or more and 30 parts by mass or less, and more preferably 1 part by mass or more and 20 parts by mass or less, based on 100 parts by mass of the total amount of the resin (C) and the photopolymerizable compound (D). When the content of the photopolymerization initiator (E) is within the above range, the curable resin composition tends to have high sensitivity and the exposure time tends to be shortened, so that the productivity of the cured film tends to improve.

The content ratio of the oxime compound (1) in the photopolymerization initiator (E) is preferably 30% by mass or more and 100% by mass or less, more preferably 50% by mass or more and 100% by mass or less, still more preferably 80% by mass or more and 100% by mass or less, yet still more preferably 90% by mass or more and 100% by mass or less, particularly preferably 95% by mass or more and 100% by mass or less, and most preferably 100% by mass, based on the total amount of the photopolymerization initiator (E), from the viewpoint of increasing the emission intensity (brightness) of the cured film.

[7] Photopolymerization Initiation Aid (E1)

The curable resin composition may further contain a photopolymerization initiation aid (E1) in combination with a photopolymerization initiator (E). The photopolymerization initiation aid (E1) is a compound or a sensitizer used to promote the polymerization of the photopolymerizable compound (D) initiated by the photopolymerization initiator (E). Examples of the photopolymerization initiation aid (E1) include amine compounds, alkoxyanthracene compounds, thioxanthone compounds, and carboxylic acid compounds.

Examples of the amine compound include triethanolamine, methyldiethanolamine, triisopropanolamine, methyl 4-dimethylaminobenzoate, ethyl 4-dimethylaminobenzoate, isoamyl 4-dimethylaminobenzoate, 2-dimethylaminoethyl benzoate, 2-ethylhexyl 4-dimethylaminobenzoate, N,N-dimethylparatoluidine, 4,4'-bis(dimethylamino)benzophenone (common name: Michler's ketone), 4,4'-bis(diethylamino)benzophenone, and 4,4'-bis(ethylmethylamino)benzophenone, and of these, 4,4'-bis(diethylamino)benzophenone is preferable. Commercially available products such as EAB-F (manufactured by Hodogaya Chemical Co., Ltd.), may be used.

Examples of the alkoxy anthracene compound include 9,10-dimethoxyanthracene, 2-ethyl-9,10-dimethoxyanthracene, 9,10-diethoxyanthracene, 2-ethyl-9,10-diethoxyanthracene, 9,10-dibutoxyanthracene, and 2-ethyl-9,10-dibutoxyanthracene.

Examples of the thioxanthone compound include 2-isopropylthioxanthone, 4-isopropylthioxanthone, 2,4-diethylthioxanthone, 2,4-dichlorothioxanthone, and 1-chloro-4-propoxythioxanthone.

Examples of the carboxylic acid compound include phenylsulfanylacetic acid, methylphenylsulfanylacetic acid, ethylphenylsulfanylacetic acid, methylethylphenylsulfanylacetic acid, dimethylphenylsulfanylacetic acid, methoxyphenysulfanylacetic acid, dimethoxyphenylsulfanylacetic acid, chlorophenylsulfanylacetic acid, dichlorophenylsulfanylacetic acid, N-phenylglycine, phenoxyacetic acid, naphthylthioacetic acid, N-naphthylglycine, and naphthoxyacetic acid.

When the curable resin composition contains a photopolymerization initiation aid (E1), the content of the photopolymerization initiation aid (E1) in the curable resin composition is preferably 0.1 parts by mass or more and 300 parts by mass or less, and more preferably 0.1 parts by mass or more and 200 parts by mass or less, based on 100 parts by mass of the photopolymerizable compound (D). Further, the content of the photopolymerization initiation aid (E1) in the curable resin composition is preferably 0.1 parts by mass or more and 30 parts by mass or less, and more preferably 1 part by mass or more and 20 parts by mass or less, based on 100 parts by mass of the total amount of the resin (C) and the photopolymerizable compound (D). When the content of the photopolymerization initiation aid (E1) is within the above range, the sensitivity of the curable resin composition can be further increased.

[8] Antioxidant (F)

The curable resin composition may further contain an antioxidant (F).

The antioxidant (F) is not particularly limited as long as it is an antioxidant that is generally used industrially, and a phenol-based antioxidant, a phosphorus-based antioxidant, a phosphorus/phenol composite antioxidant, a sulfur-based antioxidant, and the like can be used. Two or more kinds of the antioxidants (F) may be used in combination.

The phosphorus/phenol composite antioxidant may be a compound having one or more phosphorus atoms and one or more phenol structures in its molecule. In particular, from the viewpoint of developability of the curable resin composition and emission intensity of the cured film, the antioxidant (F) preferably contains a phosphorus/phenol composite antioxidant.

Examples of the phenol-based antioxidant include Irganox® 1010 (Irganox 1010: pentaerythritol tetrakis[3-(3, 5-di-tert-butyl-4-hydroxyphenyl)propionate], manufactured by BASF Japan Ltd.), Irganox 1076 (Irganox 1076: Octadecyl-3-(3,5-di-tert-butyl-4-hydroxyphenyl)propionate, manufactured by BASF Japan Ltd.), Irganox 1330 (Irganox 1330: 3,3',3'',5,5',5''-hexa-tert-butyl-a,a',a''-(mesitylene-2,4,6-triyl)tri-p-cresol, BASF Japan Ltd.), Irganox 3114 (Irganox 3114: 1,3,5-tris(3,5-di-tert-butyl-4-hydroxybenzyl)-1,3,5-triazine-2,4,6(1H,3H,5H)-trione, BASF Japan Ltd.), Irganox 3790 (Irganox 3790: 1,3,5-tris((4-tert-butyl-3-hydroxy-2,6-xylyl)methyl)-1,3,5-triazine-2,4,6(1H,3H,5H)-trione, BASF Japan Ltd.), Irganox 1035 (Irganox 1035: thiodiethylenebis[3-(3,5-di-tert-butyl-4 hydroxyphenyl)propionate], manufactured by BASF Japan Ltd.), Irganox 1135 (Irganox 1135: 3,5-bis(1,1-dimethylethyl)-4-hydroxy-C7-C9 side-chain alkyl ester of benzene propanoic acid, manufactured by BASF Japan Ltd.), Irganox 1520 L (Irganox 1520 L: 4,6-bis(octylthiomethyl)-o-cresol, manufactured by BASF Japan Ltd.), Irganox 3125 (Irganox 3125, BASF Japan Ltd.), Irganox 565 (Irganox 565: 2,4-bis(n-octylthio)-6-(4-hydroxy-3',5'-di-tert-butylanilino)-1,3,5-triazine, manufactured by BASF Japan Ltd.), ADK STAB® A0-80 (ADK STAB A0-80: 3,9-bis(2-(3-(3-tert-butyl-4-hydroxy-5-methylphenyl)propionyloxy)-1,1-dimethylethyl)-2,4,8,10-tetraoxaspiro(5,5)undecane, manufactured by ADEKA Corporation), SUMILIZER® BHT, SUMILIZER GA-80, SUMILIZER GS (manufactured by Sumitomo Chemical Co., Ltd.), Cyanox® 1790 (Cyanox 1790, manufactured by Cytec Industries Inc.), and vitamin E (manufactured by Eisai Co., Ltd.).

Examples of the phosphorus-based antioxidant include Irgafos® 168 (Irgafos 168: tris(2,4-di-tert-butylphenyl) phosphite, manufactured by BASF Japan Ltd.), Irgafos 12 (Irgafos 12: tris[2-[[2,4,8,10-tetra-tert-butyldibenzo[d,f][1,3,2]-dioxaphosphine-6-yl]oxy]ethyl]amine, manufactured by BASF Japan Ltd.), Irgafos 38 (Irgafos 38: bis(2,4-bis(1,1-dimethylethyl)-6-methylphenyl)ethyl ester phosphite, BASF Japan Ltd.), ADK STAB® 329K, Irgafos PEP36, Irgafos PEP-8 (all manufactured by ADEKA Corporation), Sandstab P-EPQ (manufactured by Clariant AG), Weston® 618, Weston 619G (manufactured by GE), and Ultranox 626 (manufactured by GE).

Examples of the phosphorus/phenol composite antioxidant include SUMILIZER® GP (6-[3-(3-tert-butyl-4-hydroxy-5-methylphenyl)propoxy]-2,4,8,10-tetra-tert-butyldibenz[d,f][1.3.2]dioxaphosphepine) (manufactured by Sumitomo Chemical Co., Ltd.).

Examples of the sulfur-based antioxidant include dialkyl thiodipropionate compounds such as dilauryl thiodipropionate, dimyristyl thiodipropionate, and distearate thiodipropionate; and β-alkylmercaptopropionic acid ester compounds of polyols such as tetrakis[methylene(3-dodecylthio) propionate]methane.

The content of the antioxidant (F) in the curable resin composition is, for example, 1 part by mass or more and 50 parts by mass or less based on 100 parts by mass of the resin (C), and is preferably 5 parts by mass or more and 40 parts by mass or less, more preferably 7 parts by mass or more and 30 parts by mass or less, and still more preferably 11 parts by mass or more and 25 parts by mass or less from the viewpoint of the light emission amount and heat resistance of the cured film.

[9] Solvent (G)

The solvent (G) is not particularly limited as long as it dissolves the resin (C), the photopolymerizable compound (D), and the photopolymerization initiator (E), and any solvent which has been used conventionally in the art can be used. Examples of the solvent (G) include an ester solvent (a solvent which contains —COO— but does not contain —O— in its molecule), an ether solvent (a solvent which contains —O— but does not contain-COO— in its molecule), an ether ester solvent (a solvent which contains —COO— and —O— in its molecule), a ketone solvent (a solvent which contains —CO— but does not contain —COO— in its molecule), an alcohol solvent (a solvent which contains OH but does not contain —O—, —CO— nor —COO— in its molecule), an aromatic hydrocarbon solvent, an amide solvent, and dimethyl sulfoxide.

Examples of the ester solvent include methyl lactate, ethyl lactate, n-butyllactate, methyl 2-hydroxy isobutanoate, ethyl acetate, n-butylacetate, isobutylacetate, n-pentyl formate, isopentyl acetate, n-butylpropionate, isopropyl butyrate, ethyl butyrate, n-butylbutyrate, methyl pyruvate, ethyl pyruvate, propyl pyruvate, methyl acetoacetate, ethyl acetoacetate, cyclohexanol acetate, and γ-butyrolactone.

Examples of the ether solvent include ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, propylene glycol monopropyl ether, propylene glycol monobutyl ether, 3-methoxy-1-butanol, 3-methoxy-3-methylbutanol, tetrahydrofuran, tetrahydropyran, 1,4-dioxane, diethylene glycol dimethyl ether, diethylene glycol diethyl ether, diethylene glycol methyl ethyl ether, diethylene glycol dipropyl ether, diethylene glycol dibutyl ether, anisole, phenetol, and methyl anisole.

Examples of the ether ester solvent include methyl methoxyacetate, ethyl methoxyacetate, butyl methoxyacetate, methyl ethoxyacetate, ethyl ethoxyacetate, methyl 3-methoxypropionate, ethyl 3-methoxypropionate, methyl 3-ethoxypropionate, ethyl 3-ethoxypropionate, methyl 2-methoxypropionate, ethyl 2-methoxypropionate, propyl 2-methoxypropionate, methyl 2-ethoxy propionate, ethyl 2-ethoxypropionate, methyl 2-methoxy-2-methylpropionate, ethyl 2-ethoxy-2-methylpropionate, 3-butyl methoxyacetate, 3-methyl-3-butyl methoxyacetate, propylene glycol monomethyl ether acetate, propylene glycol monoethyl ether acetate, propylene glycol monopropyl ether acetate, ethylene glycol monomethyl ether acetate, ethylene glycol monoethyl ether acetate, diethylene glycol monomethyl ether acetate, and diethylene glycol monobutyl ether acetate.

Examples of the ketone solvent include 4-hydroxy-4-methyl-2-pentanone, acetone, 2-butanone, 2-heptanone, 3-heptanone, 4-heptanone, 4-methyl-2-pentanone, cyclopentanone, cyclohexanone, and isophorone.

Examples of the alcohol solvent include methanol, ethanol, propanol, butanol, hexanol, cyclohexanol, ethylene glycol, propylene glycol, and glycerin.

Examples of the aromatic hydrocarbon solvent include benzene, toluene, xylene, and mesitylene.

Examples of the amide solvent include N,N-dimethylformamide, N,N-dimethylacetamide, and N-methylpyrrolidone.

The solvent (G) is preferably propylene glycol monomethyl ether acetate, ethyl lactate, propylene glycol monomethyl ether, ethyl 3-ethoxypropionate, ethylene glycol monomethyl ether, diethylene glycol monomethyl ether, diethylene glycol monoethyl ether, 4-hydroxy-4-methyl-2-pentanone, or toluene, or a mixture of two or more of these is preferred.

The solvent (G) is a component other than the solid content, and for example, the solvent contained in the quantum dots (A), the resin (C), or the like is also included in the solvent (G).

The content ratio of the solvent (G) in the curable resin composition is the ratio of the total mass of all the solvents contained in the composition to the total amount of the composition, and is, for example, based on the total amount of the curable resin composition, 40% by mass or more and 95% by mass or less, preferably 55% by mass or more and 90% by mass or less. In other words, the solid content of the curable resin composition is preferably 5% by mass or more and 60% by mass or less, and more preferably 10% by mass or more and 45% by mass or less. When the content ratio of the solvent (G) is within the above range, there is a tendency that the flatness of the composition layer at the time of coating becomes better and a cured film having an appropriate film thickness is easily formed.

[10] Leveling Agent (H)

The curable resin composition may further contain a leveling agent (H).

Examples of the leveling agent (H) include a silicone-based surfactant, a fluorine-based surfactant, and a silicone-based surfactant having a fluorine atom. These may have a polymerizable group at its side chain. The leveling agent (H) is preferably a fluorine-based surfactant from the viewpoint of developability of the curable resin composition and emission intensity of the cured film.

Examples of the silicone-based surfactant include a surfactant having a siloxane bond in its molecule. Specific examples thereof include Toray Silicone DC3PA, Toray Silicone SH7PA, Toray Silicone DC11PA, Toray Silicone SH21PA, Toray Silicone SH28PA, Toray Silicone SH29PA, Toray Silicone SH30PA, and Toray Silicone SH8400 (manufactured by Dow Corning Toray Co., Ltd.); KP321, KP322, KP323, KP324, KP326, KP340, and KP341 (manufactured by Shin-Etsu Chemical Co., Ltd.); and TSF400, TSF401, TSF410, TSF4300, TSF4440, TSF4445, TSF4446, TSF4452, and TSF4460 (manufactured by Momentive Performance Materials Inc.).

Examples of the fluorine-based surfactant include a surfactant having a fluorocarbon chain in its molecule. Specific examples thereof include Fluorad® FC430 and Fluorad FC431 (manufactured by Sumitomo 3M Limited); MEGAFACE® F142D, MEGAFACE F171, MEGAFACE F172, MEGAFACE F173, MEGAFACE F177, MEGAFACE F183, MEGAFACE F554, MEGAFACE F575, MEGAFACE R30, and MEGAFACE RS-718-K (manufactured by DIC Corporation); EFTOP® EF301, EFTOP EF303, EFTOP EF351, and EFTOP EF352 (manufactured by Mitsubishi Materials Electronic Chemicals Co., Ltd.); Surflon® 5381, Surflon 5382, Surflon SC101, and Surflon SC105 (manufactured by Asahi Glass Co., Ltd.); and E5844 (manufactured by Daikin Fine Chemical Laboratory).

Examples of the silicone-based surfactant having a fluorine atom include a surfactant having a siloxane bond and a fluorocarbon chain in its molecule. Specific examples thereof include MEGAFACE® R08, MEGAFACE BL20, MEGAFACE F475, MEGAFACE F477, and MEGAFACE F443 (manufactured by DIC Corporation).

When the curable resin composition contains a leveling agent (H), the content ratio of the leveling agent (H) in the curable resin composition is, for example, based on the total amount of the curable resin composition, 0.001% by mass or more and 1.0% by mass or less, preferably 0.005% by mass or more and 0.75% by mass or less, more preferably 0.01% by mass or more and 0.5% by mass or less, and still more preferably 0.05% by mass or more and 0.5% by mass or less. When the content ratio of the leveling agent (H) is within the above range, the flatness of the cured film can be further improved.

[11] Light Scattering Agent (I)

The curable resin composition may further contain a light scattering agent (I). Examples of the light scattering agent (I) include particles of metal or metal oxide, and glass particles.

Examples of the metal oxide include $TiO_2$, $SiO_2$, $BaTiO_3$, and $ZnO$. The particle size of the light scattering agent (I) is, for example, 0.03 μm or more and 20 μm or less, preferably 0.05 μm or more and 1 μm or less, and more preferably 0.05 μm or more and 0.5 μm or less.

As the light scattering agent (I), a light scattering agent previously dispersed in a part or the whole of the solvent (G) using a dispersant may be used. Commercially available products may also be used as the dispersant.

Examples of the commercially available products include:

Examples of such commercial products include: DISPERBYK-101, 102, 103, 106, 107, 108, 109, 110, 111, 116, 118, 130, 140, 154, 161, 162, 163, 164, 165, 166, 170, 171, 174, 180, 181, 182, 183, 184, 185, 190, 192, 2000, 2001, 2020, 2025, 2050, 2070, 2095, 2150, 2155; ANTI-TERRA-U, U100, 203, 204, 250, BYK-P104, P104S, P105, 220S, 6919; BYK-LPN6919, and 21116; LACTIMON and LACTIMON-WS; Bykumen; and the like, manufactured by BYK Japan KK;

SOLSPERSE-3000, 9000, 13000, 13240, 13650, 13940, 16000, 17000, 18000, 20000, 21000, 24000, 26000, 27000, 28000, 31845, 32000, 32500, 32550, 33500, 32600, 34750, 35100, 36600, 38500, 41000, 41090, 53095, 55000, 76500, and the like, manufactured by Lubrizol Japan Limited;

EFKA-46, 47, 48, 452, 4008, 4009, 4010, 4015, 4020, 4047, 4050, 4055, 4060, 4080, 4400, 4401, 4402, 4403, 4406, 4408, 4300, 4310, 4320, 4330, 4340, 450, 451, 453, 4540, 4550, 4560, 4800, 5010, 5065, 5066, 5070, 7500, 7554, 1101, 120, 150, 1501, 1502, 1503, and the like, manufactured by BASF Japan Ltd.; and AJISPER PA111, PB711, PB821, PB822, and PB824, manufactured by Ajinomoto Fine-Techno Co., Inc.

The content ratio of the light scattering agent (I) in the curable resin composition is, for example, based on the total solid content of the curable resin composition, 0.001% by mass or more and 50% by mass or less, and from the viewpoint of developability of the curable resin composition and emission intensity of the cured film, preferably 1% by mass or more and 30% by mass or less, and more preferably 2% by mass or more and 10% by mass or less.

If necessary, the curable resin composition may further contain an additive known in the art, such as a polymerization inhibitor, a filler, other polymeric compound, an adhesion promoter, a light stabilizer, or a chain transfer agent.

<Method for Producing Curable Resin Composition>

The method for producing the curable resin composition may include a step of mixing the quantum dots (A), the compound (B-1), the resin (C), the photopolymerizable compound (D), the photopolymerization initiator (E), and other components used as necessary. The method for producing the curable resin composition may further include a step of preparing the resin (C).

<Cured Film>

The cured film according to the present invention (hereinafter, also simply referred to as "cured film") is obtained by applying the curable resin composition according to the present invention to a substrate and further curing by the action of light and, if necessary, further by the action of heat. The cured film contains the quantum dots (A) and the resin (C) contained in the curable resin composition. Further, the cured film contains a cured reaction product of the photopolymerizable compound (D) and the photopolymerization initiator (E) contained in the curable resin composition. The cured reaction product is a substance containing a structure derived from the structure of the photopolymerizable compound (D) and the photopolymerization initiator (E). The structure derived from the structure of the photopolymerizable compound (D) or the photopolymerization initiator (E) is, for example, a skeleton structure or a portion thereof other than the curing reaction site of the photopolymerizable compound (D) or the photopolymerization initiator (E). Further, the cured film contains the compound (B-1) contained in the curable resin composition or a substance containing a structure resulting from the structure thereof.

The cured film may be formed on the entire surface of the substrate or may be formed on a part of the substrate (that is, a cured pattern). As described above, the cured pattern is one embodiment of the cured film, and refers to a cured film formed in a pattern.

Examples of the method for forming a cured film on a part of the substrate include a photolithography method, an inkjet method, and a printing method. Of these, the photolithography method is preferable. The photolithography method is a method in which a curable resin composition is applied to a substrate, dried as necessary to form a composition layer, and the composition layer is exposed to light through a photomask and developed.

Examples of a method for forming a cured film on the entire surface of a substrate include a method in which a curable resin composition is applied to a substrate, dried as necessary to form a composition layer, and the composition layer is heated and/or the entire surface of the composition layer is exposed to light.

Examples of the substrate include a glass plate made from, for example, quartz glass, borosilicate glass, alumina silicate glass, soda lime glass of which the surface is coated with silica, or the like; a resin plate made from, for example, polycarbonate, polymethyl methacrylate, polyethylene terephthalate or the like; a substrate made from silicon; and a substrate produced by forming a thin film made from aluminum, silver or a silver/copper/palladium alloy or the like on a substrate.

The formation of a cured pattern using a photolithography method can be carried out using a known or conventional device or under known or conventional conditions. For example, it can be produced as follows.

First, the curable resin composition is applied onto a substrate, and then dried by heat-drying (prebaking) and/or drying under reduced pressure to remove volatile components including a solvent from the composition, thereby producing a composition layer. Examples of the coating method include a spin coating method, a slit coating method, and a slit and spin coating method.

The temperature to be employed in the case where heat-drying is carried out is preferably 30° C. or more and 120° C. or less, more preferably 50° C. or more and 110° C. The heating time is preferably 10 seconds or more and 60 minutes or less, and more preferably 30 seconds or more and 30 minutes or less.

In the case where drying under reduced pressure is carried out, it is preferred to carry out the drying procedure under a pressure of 50 Pa or more and 150 Pa or less and at a temperature of 20° C. or more and 25° C. or less.

The film thickness of the composition layer is not particularly limited, and may be selected appropriately depending on the desired film thickness of the cured pattern to be produced, and is, for example, 1 μm or more and 20 μm or less, preferably 1.5 μm or more and 18 μm or less, more preferably 2 μm or more and 14 μm or less, and still more preferably 2 μm or more and 12 μm or less.

Next, the composition layer is exposed to light through a photomask for forming a desired cured pattern. The pattern on the photomask is not particularly limited.

The light sources used for exposure are preferably a light source that emits light having a wavelength of 250 nm or more to 450 nm or less. For example, light in the vicinity of 436 nm, 408 nm, or 365 nm may be selectively extracted from the light having the wavelength according to the absorption wavelength of the photopolymerization initiator (E) by a band-pass filter. Specific examples of the light source include a mercury lamp, a light-emitting diode, a metal halide lamp, and a halogen lamp.

A light-exposing device such as a mask aligner and a stepper is preferably used because the device is capable of emitting a parallel light beam uniformly over the whole area of the exposed surface or aligning the photomask accurately to the substrate which has the composition layer formed thereon. The exposed composition layer is cured by polymerizing the photopolymerizable compound (D) and the like contained in the composition layer.

By bringing the exposed composition layer into contact with a developing solution for development, the unexposed portion of the composition layer is dissolved and removed in the developer to obtain a cured pattern. Examples of the developer include an aqueous solution of an alkaline compound such as potassium hydroxide, sodium hydrogen carbonate, sodium carbonate and tetramethylammonium hydroxide; and organic solvents. The concentration of the alkaline compound in the aqueous solution is preferably 0.01% by mass or more and 10% by mass or less, and more preferably 0.03% by mass or more and 5% by mass or less. Examples of the organic solvent include the same as the solvent (G). The developer may contain a surfactant.

The developing method may be any of a paddle method, a dipping method, a spray method and the like. Further, the substrate may be inclined at any degree during development.

The cured pattern obtained by development is preferably further subjected to heating (post-baking). The heating temperature is carried out is preferably 150° C. or more and 250° C. or less, more preferably 160° C. or more and 235° C. The heating time is preferably 1 minute or more and 120 minutes or less, and more preferably 10 minutes or more and 60 minutes or less. By performing heating after development, polymerization of the unreacted photopolymerizable compound (D) and the like contained in the cured pattern can be advanced, and therefore, a cured pattern having more excellent chemical resistance can be obtained. Even in the case where development is not performed, it is preferable to further perform heating (post-baking) on the exposed composition layer.

By irradiating the cured film with ultraviolet light or visible light, the cured film can emit light having a wavelength different from that of the irradiation light. The wavelength of light to be emitted can be selected by selecting the components and the particle size of the quantum dots (A) in the curable resin composition used for forming the cured film. Since the cured film has a function of converting the wavelength of irradiation light as described above, it can be used as a color conversion layer (wavelength conversion film) of a display device.

The cured film can exhibit good emission intensity. The cured film preferably has a light emission intensity (brightness) measured in accordance with the measurement method described later in the section of Examples below, of 1100 μW or more, more preferably 1200 μW or more, still more preferably 1300 μW or more, and yet still more preferably 1350 μW or more.

The emission intensity of the cured film is, for example, when the content ratio of the quantum dots (A) in the curable resin composition is 21.5% by mass, preferably 1100 μW or more, more preferably 1200 μW or more, still more preferably 1300 μW or more, and yet still more preferably 1350 μW or more.

The film thickness of the cured film is 1 μm or more and 20 μm or less, preferably 1.5 μm or more and 18 μm or less, more preferably 2 μm or more and 14 μm or less, and still more preferably 2 μm or more and 12 μm or less.

The curable resin composition according to the present invention is useful as a color conversion layer of a display device, in particular, a liquid crystal display device, an organic EL display device, or an inorganic EL display device, as it is possible to form a curable resin composition having a sufficiently high development speed and capable of forming a cured film having good emission intensity. Examples of such a display device include display devices disclosed in Japanese Patent Laid-Open No. 2006-309219, Japanese Patent Laid-Open No. 2006-310303, Japanese Patent Laid-Open No. 2013-15812, Japanese Patent Laid-Open No. 2009-251129, and Japanese Patent Laid-Open No. 2014-2363.

The display device includes at least a light source and the cured film. The display device is not particularly limited, and may further include layers such as a light absorption layer, a light reflection member (such as a reflection film), a diffusion film, a brightness enhancement unit, a prism sheet, a light guide plate, and a medium material layer between elements.

The light absorption layer is a layer having wavelength selectivity that transmits light in a specific wavelength range and absorbs light in other wavelength ranges. The light absorption layer is usually a layer containing a colorant such as a dye or a pigment, and can be arranged on the cured film. As the light absorption layer, a conventionally known color filter can be used.

The light reflection member is a member for reflecting the light of the light source toward the cured film, and may be a reflecting mirror, a film of reflective particles, a reflective metal film, a reflective body, or the like. The diffusion film is a film for diffusing the light of a light source or the light emitted from a cured film, and may be an amplified diffusing film or the like. The brightness enhancement unit is a member for reflecting a part of light back in the direction in which the light is transmitted.

The prism sheet typically has a base material section and a prism section. The base material section may be omitted, depending on the adjacent members. The prism sheet can be pasted together with the adjacent members via any appropriate adhesive layer (for example, an adhesive layer or a pressure sensitive adhesive layer). The prism sheet is configured to have a plurality of unit prisms that are convex in parallel on the side opposite to the visible side (rear side). By arranging the convex sections of the prism sheet toward the rear side, the light that passes through the prism sheet is more likely to be focused. Also, when the convex sections of the prism sheet are arranged toward the rear side, there is less light reflected without incident on the prism sheet compared to the case where the convex sections are arranged toward the visible side, and a display device with high brightness can be obtained.

Any appropriate light guide plate may be used as the light guide plate. For example, a light guide plate having a lens pattern formed on the rear side such that light from the lateral direction can be deflected in the thickness direction or a light guide plate having a prism shape or the like formed on the rear side and/or the visible side can be used.

The display device may include a layer composed of one or more medium materials on the optical path between adjacent elements (layers). Examples of the one or more medium materials include, but not limited to, vacuum, air, gas, optical materials, adhesives, optical adhesives, glass, polymers, solids, liquids, gels, cured materials, optical bonding materials, refractive index matching or refractive index mismatching materials, refractive index gradient materials, cladding or anti-cladding materials, spacers, silica gel, brightness enhancement materials, scattering or diffusion materials, reflective or anti-reflective materials, wavelength selective materials, wavelength selective anti-reflective materials, or other suitable media known in the art.

Specific examples of the display device include those provided with a wavelength conversion material for an EL display or a liquid crystal display. Specific examples thereof include a display device in which the cured film as a wavelength conversion layer is disposed between a blue light source (A) and a light guide plate along an end surface (side surface) of the light guide plate to form a backlight (on-edge type backlight) that emits white light, and a light absorption layer is arranged on the light guide plate side; a display device in which the cured film as a wavelength conversion layer is disposed on a light guide plate to form a backlight (surface mounting type backlight) that emits light emitted from a blue light source disposed on an end surface (side surface) of the light guide plate to the wavelength conversion layer through the light guide plate as white light, and a light absorption layer is disposed on the wavelength conversion layer; and a display device in which the cured film is disposed in the vicinity of a light-emitting portion of a blue light source to form a wavelength conversion layer, a backlight (on-chip backlight) that emits irradiated light as white light, and a light absorption layer is disposed on the wavelength conversion layer.

EXAMPLES

Hereinafter, the present invention will be described in more detail by way of examples. Unless otherwise specified, "%" and "part" in the example are % by mass and parts by mass.

[Measurement of Emission Intensity]

Onto a 5-cm square glass substrate (Eagle 2000; manufactured by Corning Incorporated), a curable resin composition was applied by a spin coat method so that the film thickness set to 10 µm, and then prebaked at 100° C. for 3 minutes, to form a curable composition layer. This curable composition layer was subjected to light irradiation in an exposure amount (basis: 365 nm) of 80 mJ/cm$^2$ under an air atmosphere using an exposure device (TME-150RSK; manufactured by TOPCON CORPORATION) and after development, post-baking was performed 180° C. for 60 minutes, to obtain a substrate having a cured film.

A narrow directional angle type sensing backlight illumination (OPF series; manufactured by OPTEX FA CO., LTD.) equipped with an LED lamp having an emission wavelength of 444 nm and a scratch resistant cover was prepared as a backlight. A backlight was placed with the scratch resistant cover facing upward, and an optical fiber for detecting light emission connected to the following spectrometer was installed at a position 4 cm high from the surface of the scratch resistant cover. A glass substrate (Eagle 2000; manufactured by Corning Incorporated) as a reference was placed on the surface of the scratch resistant cover of the backlight. In this state, the backlight was turned on, and the light amount of the backlight was adjusted so that the total radiant flux (µW) of the backlight was 5000 µW through a reference glass substrate (Eagle 2000; manufactured by Corning Incorporated).

Next, the substrate having the cured film prepared above was disposed on the surface of the glass substrate. In this state, the backlight was turned on, and the emission intensity (unit: µW) of the light emitted from the cured film was measured as an integrated radiant flux in a range of wavelengths of 485 nm or more and 780 nm or less. The emission intensity was measured using a spectrum analyzer (Spectrum meter, manufactured by Ocean Optics, Inc).

[Measurement of Development Speed]

Onto a 5-cm square glass substrate (Eagle 2000; manufactured by Corning Incorporated), a curable resin composition was applied by a spin coat method so that the film thickness set to 10 µm, and then prebaked at 100° C. for 3 minutes, to form a curable resin composition layer. The substrate having the curable resin composition layer was immersed in a developer (0.048% aqueous solution of potassium hydroxide) and developed. The development speed was evaluated by measuring the time (seconds) at which the curable resin composition layer was completely removed.

[Measurement of Residual Film Ratio]

The solvent resistance was evaluated by measuring the residual film ratio in the following tests.

Onto a 5-cm square glass substrate (Eagle 2000; manufactured by Corning Corporation), a curable resin composition was applied by a spin coat method so that the film thickness set to 10 µm, and then prebaked at 100° C. for 3 minutes, to form a curable composition layer. This curable composition layer was subjected to light irradiation in an exposure amount (basis: 365 nm) of 80 mJ/cm$^2$ under an air atmosphere using an exposure device (TME-150RSK; manufactured by TOPCON CORPORATION) and after development, post-baking was performed 180° C. for 60 minutes, to obtain a substrate having a cured film.

Next, the substrate having the cured film was immersed in acetone at 25° C. for 5 hours, and the residual film ratio was measured according to the following formula. The film thickness of the cured film was measured by measuring the level difference of a scratch formed on the surface of the cured film using a stylus profilometer (DektakXT, manufactured by Bruker Japan K.K.).

Residual film ratio (%)=100×(film thickness of cured film after test)/(film thickness of cured film before test)

[Weight-Average Molecular Weight]

The weight-average molecular weight (Mw) of the resin (C-1) was measured by the GPC method under the following conditions.

Equipment: K2479 (manufactured by Shimadzu Corporation)
Column: SHIMADZU Shim-pack GPC-80M
Column temperature: 40° C.
Solvent: tetrahydrofuran
Flow rate: 1.0 mL/min
Detector: RI
Standard for calibration; TSK STANDARD POLYSTYRENE F-40, F-4, F-288, A-2500, A-500 (manufactured by Tosoh Corporation)

[Acid Value]

3 g of the resin (C-1) solution was finely weighed, dissolved in a mixed solvent of 90 g of acetone and 10 g of water, and the acid value of the resin (C-1) solution was measured by an automatic titrator (manufactured by HIRANUMA Co., Ltd., trade name: COM-555) using the KOH aqueous solution specified in 0.1 as the titrant, and the acid value (AV) per 1 g of solid content was determined from the acid value of the solution and the solid content of the solution.

[Solid Content]

About 1 g of the resin (C-1) solution was weighed in an aluminum cup, dried at 180° C. for 1 hour, and then the mass was measured. The solid content (% by mass) of the resin (C-1) solution was calculated from the mass reduction amount.

Production Example 1: Preparation of Dispersion of Quantum Dots (A-1)

A toluene dispersion of InP/ZnSeS quantum dots coordinated with oleic acid as a ligand was prepared. The dispersion was distilled under reduced pressure to remove toluene. To 30 parts of the solid content, 70 parts of cyclohexyl acetate was added to obtain a dispersion (solid content: 30%) of quantum dots (a-1).

Production Example 2: Preparation of Dispersion of Light Scattering Agent (I-1)

DISPERBYK21116 (manufactured by BYK Japan KK) was added to 70 parts of titanium oxide nanoparticles in a solid content of 3 parts and propylene glycol monomethyl ether acetate (hereinafter referred to as "PGMEA") in a total amount of 100 parts, and the mixture was stirred with a paint shaker until it was sufficiently dispersed to obtain a dispersion (solid content: 73%) of a scattering agent (I-1).

Production Example 3: Preparation of Resin (C-1) Solution

After 110 parts of PGMEA was put into a flask equipped with a stirrer, a reflux cooling tube with a thermometer, a dropping funnel, and a nitrogen introduction tube, the mixture was stirred while purging nitrogen, and the temperature was raised to 80° C. A solution obtained by dissolving 25 parts of dicyclopentanyl methacrylate, 26 parts of methyl methacrylate, 16 parts of methacrylic acid, and 11 parts of 2,2'-azobis(2,4-dimethylvaleronitrile) in 110 parts of PGMEA was dropped from a dropping funnel into a flask, and stirred at 80° C. for 3 hours.

Next, 16 parts of glycidyl methacrylate, 0.4 parts of 2,2'-methylenebis(4-methyl-6 tert-butylphenol), and 0.8 parts of triphenylphosphine were put into a flask, and the temperature was raised to 110° C. and stirred for 8 hours to react the carboxylic acid in the polymer with the epoxy group to introduce a polymerizable unsaturated bond. Then, 17 parts of 1,2,3,6-tetrahydrophthalic acid anhydride was added and the reaction was continued for 3 hours to introduce carboxylic acid groups into the side chains. The reaction solution was cooled to room temperature to obtain a resin (C-1) solution.

The resin (C-1) had a weight-average molecular weight of 7600 in terms of standard polystyrene, a molecular weight distribution of 2.1, and an acid value of 100 mg KOH/g, and the solid content in the resin (C-1) solution was 40% by mass.

Example 1

(1) Preparation of Quantum Dot Dispersion Solution Containing Compound (B-1) and Compound (B-3)

A predetermined amount of the compound (B-1) was added to the dispersion of the quantum dots (A-1) obtained in Production Example 1, and the mixture was stirred at 80° C. for 2 hours to obtain a quantum dot dispersion containing the compound (B-1) and the compound (B-3).

The compound (B-3) refers to oleic acid of the InP/ZnSeS quantum dots with which oleic acid is coordinated used in Production Example 1.

(2) Preparation of Curable Resin Composition

A curable resin composition was prepared by mixing predetermined amounts of the quantum dot dispersion containing the compound (B-1) and the compound (B-3) obtained in the above (1), the dispersion of the light scattering agent (I-1) obtained in Production Example 2, the resin (C-1) solution obtained in Production Example 3, and other components shown in Table 1.

The content of each component in the curable resin composition obtained from the addition amount is as shown in Table 1. In Table 1, the contents of components other than the solvent (G) are in terms of solid content (unit: parts by mass). The unit of the content of the solvent (G) is parts by mass. For example, the quantum dots (A-1) are blended as a dispersion of the quantum dots (A-1) in the preparation of the curable resin composition, and the content shown in Table 1 is the amount of the quantum dots (A-1) itself contained in the solution. The solvent (G) in Table 1 contains a solvent contained in the dispersion or solution used for preparing the curable resin composition.

The content of the compound (B-3) in the curable resin composition shown in Table 1 was calculated based on the measurement of the concentration of the compound (B-3) in the dispersion of the quantum dots (A-1) obtained in Production Example 1 according to the method [a] below.

Examples 2 to 4

(1) Preparation of Quantum Dot Dispersion Solution Containing Compounds (B-1) to (B-3)

A predetermined amount of the compound (B-2) was added to the dispersion of the quantum dots (A-1) obtained in Production Example 1, the mixture was stirred at 80° C. for 12 hours, and then the obtained dispersion was dropped to hexane to perform a precipitation treatment. The precipitate was recovered and redispersed in cyclohexyl acetate to remove a part of the compound (B-3), thereby obtaining a quantum dot dispersion X (solid content: 30%) containing the compound (B-2).

A predetermined amount of the compound (B-1) was added to the quantum dot dispersion X, and the mixture was stirred at 80° C. for 2 hours to obtain a quantum dot dispersion Y containing the compounds (B-1) to (B-3).

(2) Preparation of Curable Resin Composition

A curable resin composition was prepared by mixing predetermined amounts of the quantum dot dispersion Y containing the compounds (B-1) to (B-3) obtained in the above (1), the dispersion of the light scattering agent (I-1) obtained in Production Example 2, the resin (C-1) solution obtained in Production Example 3, and other components shown in Table 1.

The content of each component in the curable resin composition obtained from the addition amount is as shown in Table 1.

The respective contents of the compound (B-2) and the compound (B-3) in the curable resin composition shown in Table 1 were calculated based on the total concentration of the compound (B-2) and the compound (B-3) in the quantum dot dispersion X measured according to the following method and the ratio of contents between the compound (B-2) and the compound (B-3) in the quantum dot dispersion X measured according to the following method.

[A] Measurement of Total Concentration of Compound (B-2) and Compound (B-3)

After the solvent was removed by vacuum-drying the quantum dot dispersion X at 150° C., the weight change of the remaining solid content was measured at a temperature increasing rate of 5° C./min from 50° C. to 550° C. using a thermogravimetric analyzer "TGDTA 6200". The total concentration of the compound (B-2) and the compound (B-3) in the quantum dot dispersion X was calculated using the weight change from 50° C. to 500° C. as the total weight of the compound (B-2) and the compound (B-3).

[b] Measurement of Ratio of Contents Between Compound (B-2) and Compound (B-3)

GC/MS analysis was performed on the quantum dot dispersion X using a GC/MS analyzer "7890B/5977A (manufactured by Agilent Technologies, Inc.). The measurement conditions were as follows.

Measurement sample: 1 part by mass of quantum dot dispersion X diluted with 3 parts by mass of acetone
Column: DB-5 (0.25 mm×30 m, film thickness: 250 mm)
Carrier gas: He, 1 mL/min
Column temperature: 50° C. (5 minutes)→10° C./min→320° C. (8 minutes)
Detector: MS
Injection port temperature: 200° C.
AuX temperature: 250° C.
Split: 40:1
Injection volume: 1 μL
Ion source: EI, m/z 10-600

A calibration curve was prepared using PGMEA as the standard, and the ratio of contents between the compound (B-2) and the compound (B-3) in the quantum dot dispersion X was obtained from GC/MS analysis based on the calibration curve.

Example 5

A curable resin composition was prepared in the same manner as in Example 1 except that the photopolymerization initiator (E-2) was used instead of the photopolymerization initiator (E-1).

Example 6

A curable resin composition was prepared in the same manner as in Example 5 except that the compounds shown in Table 1 were used as the photopolymerizable compound (D) in the amounts shown in Table 1.

Comparative Example 1

A curable resin composition was prepared in the same manner as in Example 5 except that the dispersion of the quantum dots (A-1) was used instead of the quantum dot dispersion containing the compound (B-1) and the compound (B-3), and the addition amount of the resin (C-1) solution was changed.

The emission intensity (brightness), the development speed, and the residual film ratio of the obtained curable resin composition were measured and evaluated according to the above. The results are also shown in Table 1.

TABLE 1

|  |  | Example | | | | | | Comparative Example |
|---|---|---|---|---|---|---|---|---|
|  |  | 1 | 2 | 3 | 4 | 5 | 6 | 1 |
| Quantum dots (A) | A-1 | 21.5 | 21.5 | 21.5 | 21.5 | 21.5 | 21.5 | 21.5 |
| Compound (B) | B-1 | 0.6 | 0.6 | 0.6 | 1.2 | 0.6 | 0.6 | |
|  | B-2 |  | 6.3 | 6.3 | 6.3 |  |  |  |
|  | B-3 | 8.5 | 2.2 | 2.2 | 2.2 | 8.5 | 8.5 | 8.5 |
| Resin (C) | C-1 | 44.0 | 44.0 | 38.1 | 37.5 | 44.0 | 44.0 | 44.6 |
| Photopolymerizable compound (D) | D-1 | 6.0 | 6.0 | 8.9 | 8.9 | 6.0 |  | 6 |
|  | D-2 | 8.9 | 8.9 | 11.9 | 11.9 | 8.9 | 14.9 | 8.9 |
| Photopolymerization initiator (E) | E-1 | 1.8 | 1.8 | 1.8 | 1.8 |  |  |  |
|  | E-2 |  |  |  |  | 1.8 | 1.8 | 1.8 |
| Antioxidant (F) | F-1 | 3.6 | 3.6 | 3.6 | 3.6 | 3.6 | 3.6 | 3.6 |
| Solvent (G) | G-1 | 100 | 100 | 100 | 100 | 100 | 100 | 100 |
|  | G-2 | 86 | 86 | 86 | 86 | 86 | 86 | 86 |
| Leveling agent (H) | H-1 | 0.1 | 0.1 | 0.1 | 0.1 | 0.1 | 0.1 | 0.1 |
| Light scattering agent (I) | I-1 | 5 | 5 | 5 | 5 | 5 | 5 | 5 |
| Emission intensity | (μW) | 1260 | 1387 | 1356 | 1326 | 1109 | 1195 | 1024 |
| Development speed | (seconds) | 157 | 88 | 84 | 80 | 166 | 92 | 193 |
| Residual film ratio | (%) | 99.6 | 99.7 | 99.7 | 99.5 | 98.9 | 95.8 | 78.3 |

The details of the abbreviations of the components shown in Table 1 are as follows.

[1] Compound (B-1): 3-mercaptopropionic acid (manufactured by Tokyo Chemical Industry Co., Ltd., 100% solid content)

[2] Compound (B-2): 2-[2-(2-methoxyethoxy)ethoxy] acetic acid (manufactured by Sigma-Aldrich, 100% solid content)

[3] Compound (B-3): oleic acid

[4] Photopolymerizable compound (D-1): M-510 (polybasic modified acrylate, manufactured by Toagosei Co., Ltd., solid content: 100%)

[5] Photopolymerizable compound (D-2): A-9550 (dipentaerythritol polyacrylate, manufactured by SHIN-NAKAMURA CHEMICAL Co., Ltd., solid content: 100%)

[6] Photopolymerization Initiator (E-1): compound represented by the following formula. Production was performed by the method disclosed in Japanese Patent Laid-Open No. 2011-132215 (solid content: 100%).

[Formula 23]

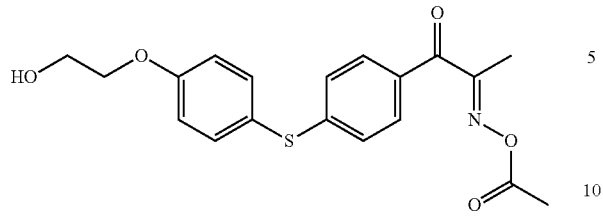

[Formula 1]

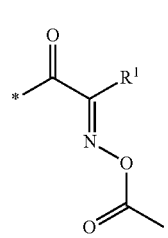

(1)

[7] Photopolymerization Initiator (E-2): Irgacure OXE01 (manufactured by BASF Japan Ltd., solid content: 100%)
[8] Antioxidant (F-1): SUMILIZER-GP (phosphorus/phenol composite antioxidant, manufactured by Sumitomo Chemical Co., Ltd., solid content: 100%)
[9] Solvent (G-1): PGMEA (propylene glycol monomethyl ether acetate)
[10] Solvent (G-2): cyclohexyl acetate
[11] Leveling agent (H-1): F-554 (fluorine-based leveling agent, manufactured by DIC Corporation, solid content: 100%)

The invention claimed is:

1. A curable resin composition comprising: quantum dots (A); a compound (B-1) having a first functional group and a second functional group; a compound (B-2) different from the compound (B-1), the compound (B-2) containing a polyalkylene glycol structure and having a polar group at a molecular end, a resin (C); a photopolymerizable compound (D); and a photopolymerization initiator (E),
wherein the first functional group is a carboxy group, the second functional group is a carboxy group or a thiol group, and the polar group is a carboxy group.

2. The curable resin composition according to claim 1, wherein the compound (B-1) has a molecular weight of 3000 or less.

3. The curable resin composition according to claim 1, wherein a content of the compound (B-2) to a content of the compound (B-1) in terms of mass ratio is 1 or more and 50 or less.

4. The curable resin composition according to claim 1, wherein the resin (C) is a polyalkylene glycol compound.

5. The curable resin composition according to claim 1, wherein a content of the photopolymerizable compound (D) is 13% by mass or more based on a total amount of a solid content of the curable resin composition.

6. The curable resin composition according to claim 1, wherein the photopolymerizable compound (D) contains 50% by mass or more of a photopolymerizable compound having three or more ethylenically unsaturated bonds in a molecule and having no carboxy group.

7. The curable resin composition according to claim 1, wherein the photopolymerization initiator (E) contains an oxime compound having a first molecular structure represented by the following formula (1):

wherein $R^1$ represents $R^{11}$, $OR^{11}$, $COR^{11}$, $SR^{11}$, $CONR^{12}R^{13}$, or CN;
$R^{11}$, $R^{12}$, and $R^{13}$ each independently represent a hydrogen atom, an alkyl group having 1 to 20 carbon atoms, an aryl group having 6 to 30 carbon atoms, an aralkyl group having 7 to 30 carbon atoms, or a heterocyclic group having 2 to 20 carbon atoms;
the hydrogen atoms of the group represented by $R^{11}$, $R^{12}$, or $R^{13}$ are optionally replaced by $OR^{21}$, $COR^{21}$, $SR^{21}$, $NR^{22}Ra^{23}$, $CONR^{22}R^{23}$, $-NR^{22}-OR^{23}$, $-N(COR^{22})-OCOR^{23}$, $-C(=N-OR^{21})-R^{22}$, $-C(=N-OCOR^{21})-R^{22}$, CN, a halogen atom, or $COOR^{21}$;
$R^{21}$, $R^{22}$, and $R^{23}$ each independently represent a hydrogen atom, an alkyl group having 1 to 20 carbon atoms, an aryl group having 6 to 30 carbon atoms, an aralkyl group having 7 to 30 carbon atoms, or a heterocyclic group having 2 to 20 carbon atoms;
the hydrogen atoms of the group represented by $R^{21}$, $R^{22}$, or $R^{23}$ are optionally replaced by CN, a halogen atom, a hydroxy group, or a carboxy group;
when the group represented by $R^{11}$, $R^{12}$, $R^{13}$, $R^{21}$, $R^{22}$, or $R^{23}$ has an alkylene moiety, the alkylene moiety is optionally interrupted one to five times by —O—, —S—, —COO—, —OCO—, —NR$^{24}$—, —NR$^{24}$CO—, —NR$^{24}$COO—, —OCONR$^{24}$—, —SCO—, —COS—, —OCS—, or —CSO—;
$R^{24}$ represents a hydrogen atom, an alkyl group having 1 to 20 carbon atoms, an aryl group having 6 to 30 carbon atoms, an aralkyl group having 7 to 30 carbon atoms, or a heterocyclic group having 2 to 20 carbon atoms;
when the group represented by $R^{11}$, $R^{12}$, $R^{13}$, $R^{21}$, $R^{22}$, or $R^{23}$ has an alkyl moiety, the alkyl moiety is optionally branched or cyclic, and $R^{12}$ and $R^{13}$, and $R^{22}$ and $R^{23}$ are each optionally joined together to form a ring; and
* represents a bond with a second molecular structure which is a molecular structure other than the first molecular structure of the oxime compound.

8. A cured film formed from the curable resin composition according to claim 1.

9. A display device comprising the cured film according to claim 8.

* * * * *